United States Patent
Luo et al.

(10) Patent No.: US 8,380,242 B2
(45) Date of Patent: **\*Feb. 19, 2013**

(54) METHODS AND SYSTEMS FOR AUDIO AND VIDEO COMMUNICATION

(75) Inventors: Wan Chi Luo, Tainan (TW); Hagihara Tadanori, Taipei (TW); Tung-Yi Wang, Taipei Hsien (TW)

(73) Assignee: Mediatek Inc., Hsin-Chu (TW)

( * ) Notice: Subject to any disclaimer, the term of this patent is extended or adjusted under 35 U.S.C. 154(b) by 165 days.

This patent is subject to a terminal disclaimer.

(21) Appl. No.: 12/917,871

(22) Filed: Nov. 2, 2010

(65) Prior Publication Data

US 2011/0043599 A1 Feb. 24, 2011

Related U.S. Application Data

(63) Continuation of application No. 11/332,763, filed on Jan. 13, 2006, now Pat. No. 7,848,772.

(60) Provisional application No. 60/644,358, filed on Jan. 14, 2005.

(51) Int. Cl.
*H04M 1/00* (2006.01)
(52) U.S. Cl. ............ 455/550.1; 455/515; 455/425; 455/557; 370/259; 370/260
(58) Field of Classification Search ............ 455/550.1, 455/515
See application file for complete search history.

(56) References Cited

U.S. PATENT DOCUMENTS

| | | | |
|---|---|---|---|
| 5,768,126 A | 6/1998 | Frederick | |
| 5,999,207 A | 12/1999 | Rodriguez et al. | |
| 6,124,882 A | 9/2000 | Voois et al. | |
| 6,148,354 A | 11/2000 | Ban et al. | |
| 6,522,352 B1 | 2/2003 | Strandwitz et al. | |
| 6,714,233 B2 | 3/2004 | Chihara et al. | |
| 6,895,256 B2 | 5/2005 | Harma et al. | |
| 7,003,795 B2 | 2/2006 | Allen | |
| 7,062,291 B2 | 6/2006 | Ryley et al. | |
| 7,173,651 B1 | 2/2007 | Knowles | |
| 7,256,821 B2 | 8/2007 | Hata | |
| 2003/0009568 A1 | 1/2003 | McIntyre | |
| 2003/0142200 A1 | 7/2003 | Canova, Jr. et al. | |
| 2004/0075741 A1 | 4/2004 | Berkey et al. | |

(Continued)

FOREIGN PATENT DOCUMENTS

| | | |
|---|---|---|
| JP | 9214915 | 8/1997 |
| JP | 2004-186757 | 7/2004 |

(Continued)

OTHER PUBLICATIONS

English language translation of abstract of TW 436745 (published May 28, 2001).

(Continued)

*Primary Examiner* — Lester Kincaid
*Assistant Examiner* — Isaak R Jama
(74) *Attorney, Agent, or Firm* — McClure, Qualey & Rodack, LLP

(57) ABSTRACT

Systems for audio and video communication used in a mobile electronic device are provided. An embodiment of a system comprises a display object generation unit, an acoustic object generation unit and a transport unit. The display object generation unit repeatedly generates display objects corresponding to intensity of light sensed by an image sensor module of the mobile electronic device. The acoustic object generation unit repeatedly generates acoustic objects corresponding to sound signals detected by a microphone of the mobile electronic device. The transport unit simultaneously transports the generated display and acoustic objects to a computer host when the mobile electronic device operates as a webcam.

18 Claims, 28 Drawing Sheets

U.S. PATENT DOCUMENTS

| | | |
|---|---|---|
| 2004/0207719 A1 | 10/2004 | Tervo et al. |
| 2005/0064856 A1 | 3/2005 | Atkin et al. |
| 2005/0162508 A1* | 7/2005 | Basmadjian et al. ...... 348/14.01 |
| 2006/0041627 A1 | 2/2006 | Tu |
| 2006/0123113 A1 | 6/2006 | Friedman |

FOREIGN PATENT DOCUMENTS

| | | |
|---|---|---|
| TW | 436745 | 5/2001 |
| TW | 567688 | 12/2003 |
| WO | WO 2005/112400 | 11/2005 |

OTHER PUBLICATIONS

English language translation of abstract of TW 567688 (published Dec. 21, 2003).

English language translation of abstract of JP 2004-186757 (published Jul. 2, 2004).

English language translation of abstract of WO 2005/112400 (p. 1 of publication, published Nov. 24, 2005).

* cited by examiner

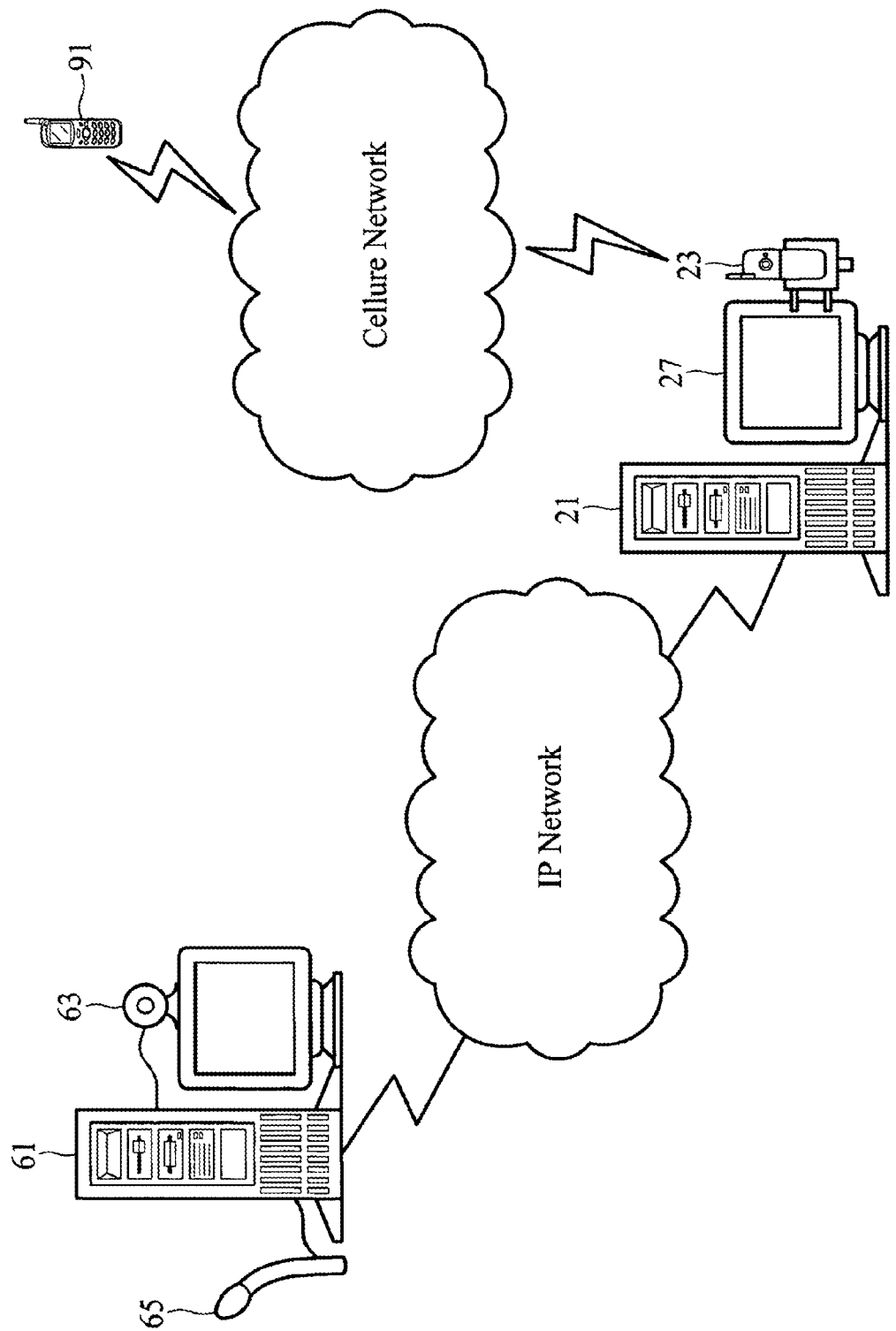

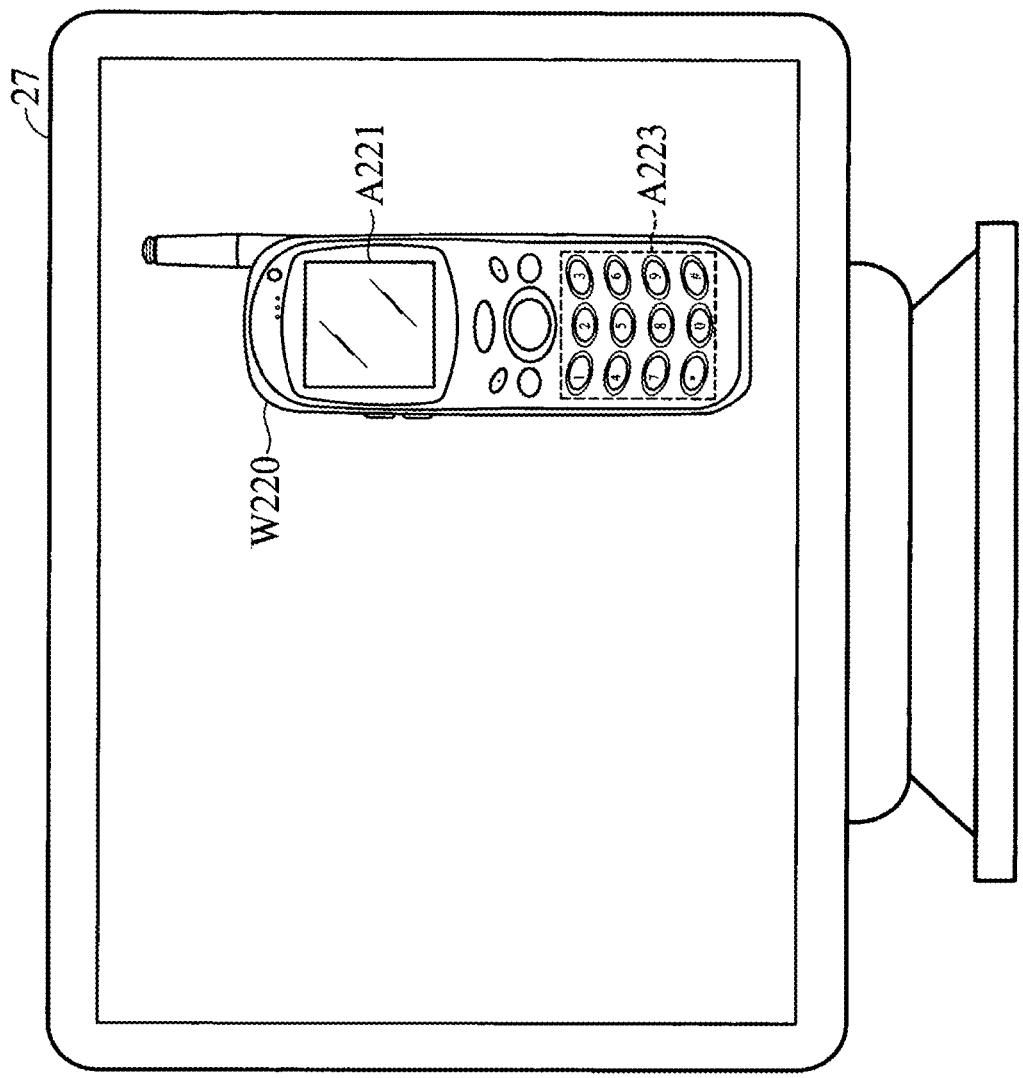

METHODS AND SYSTEMS FOR AUDIO AND VIDEO COMMUNICATION

CROSS-REFERENCE TO RELATED APPLICATIONS

The present application is a continuation pending U.S. application Ser. No. 11/332,763, filed Jan. 13, 2006, entitled, "METHODS AND SYSTEMS FOR AUDIO AND VIDEO COMMUNICATION," which claims the benefit of U.S. provisional application, entitled "METHODS AND SYSTEMS FOR IMPLEMENTING WEBCAM FUNCTIONS USING MOBILE ELECTRONIC DEVICES", Ser. No. 60/644,358, filed Jan. 14, 2005, both of which are incorporated herein in their entirety.

BACKGROUND

The invention relates to a webcam functions, and more particularly, to methods and systems for audio and video communication.

FIG. 1 is a diagram of a personal computer 11 equipped with conventional webcam 13. The webcam 13 (also called a web camera) is an isolated video camera used to capture and transmit periodic images or continuous frames to the personal computer 11, and subsequently the personal computer 11 transmits images or frames to a remote computer for display via Internet. Webcam software resident on the personal computer 11 typically captures the images as JPEG or MPEG files and uploads them to the Web server.

Recently, there are thousands of webcams that provide views into homes and offices. As webcam capabilities have been added to instant messaging services such as Yahoo Messenger, AOL Instant Messenger (AIM) and MSN Messenger, the live video communication over the internet, which may be one-to-one, one-to-multiple, or multiple-to-multiple live video communication, has now reached millions of mainstream PC users worldwide. WWW users, however, must purchase webcams to provide images.

SUMMARY

Systems for audio and video communication used in a mobile electronic device are provided. An embodiment of a system comprises a display object generation unit, an acoustic object generation unit and a transport unit. The display object generation unit repeatedly generates display objects corresponding to intensity of light sensed by an image sensor module of the mobile electronic device. The acoustic object generation unit repeatedly generates acoustic objects corresponding to sound signals detected by a microphone of the mobile electronic device. The transport unit coupling to the display object generation unit and the acoustic object generation unit simultaneously transports the generated display and acoustic objects to a computer host when the mobile electronic device operates as a webcam, thereby the generated display and acoustic objects are transmitted to a remote electronic apparatus/device through an internet protocol (IP) network by a computer host coupling to the mobile electronic device.

Methods for audio and video communication performed by a mobile electronic device are provided. An embodiment of a method comprises the following steps. Display objects corresponding to intensity of light sensed by an image sensor module of the mobile electronic device are repeatedly generated. First acoustic objects corresponding to sound signals detected by a microphone of the mobile electronic device are repeatedly generated. The generated display and acoustic objects are simultaneously transported to a computer host when the mobile electronic device operates as a webcam, thereby the generated display and acoustic objects to be transmitted to a remote electronic apparatus/device through a internet protocol (IP) network by a computer host coupling to the mobile electronic device.

Methods for audio and video communication performed by a mobile electronic device are provided. A computer host couples to the mobile electronic device operating as a webcam of the computer host. An embodiment of a method comprises the following steps. Display objects and acoustic objects are received from the coupled mobile electronic device. The received display objects and acoustic objects are transmitted to a remote electronic apparatus/device through an Internet protocol (IP) network via a peer-to-peer (P2P) communication application resident on the computer host. A command is periodically issued to the mobile electronic device. A communication event associated with a cellular network and occurred in the coupled mobile electronic device is monitored by receiving a reply corresponding to the issued command or by receiving no reply.

BRIEF DESCRIPTION OF DRAWINGS

The present invention can be more fully understood by reading the subsequent detailed description and examples with references made to the accompanying drawings, wherein:

FIG. 9 is a diagram of data communication among three parties through an IP network and a cellular network;

FIG. 22 is a diagram of an exemplary interface.

DETAILED DESCRIPTION

Figure 1:
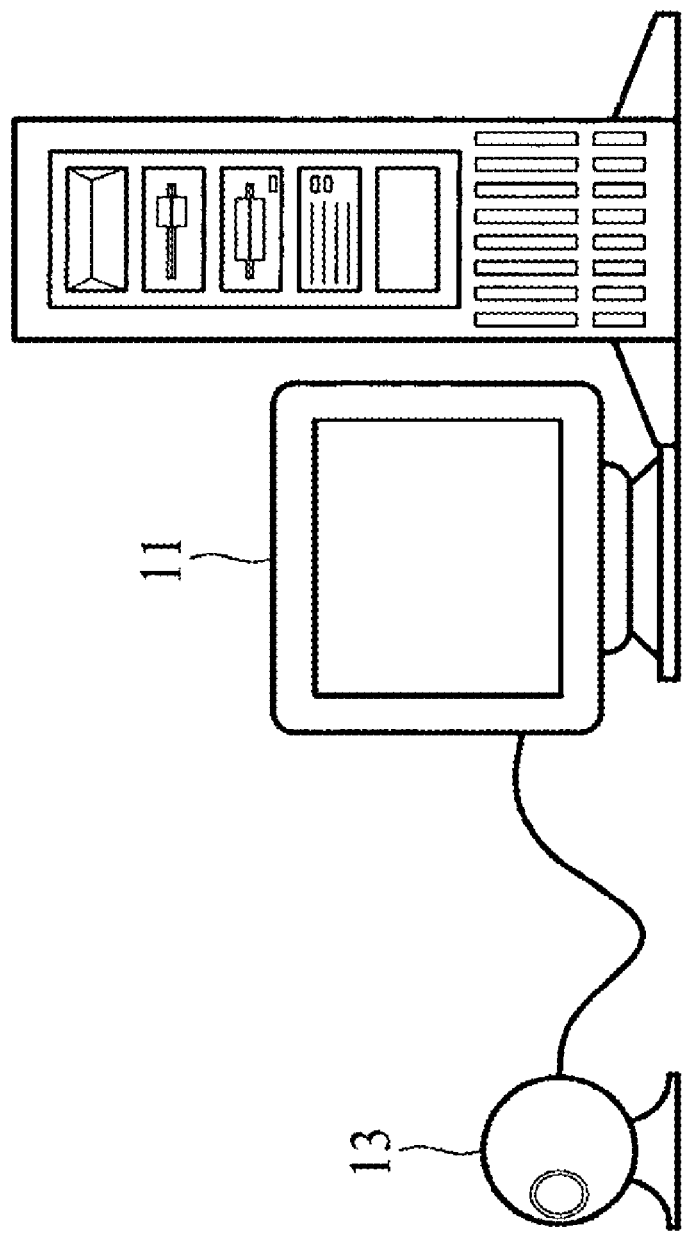
FIG. 1 is a diagram of a personal computer equipped with the conventional webcam.
Figure 2:
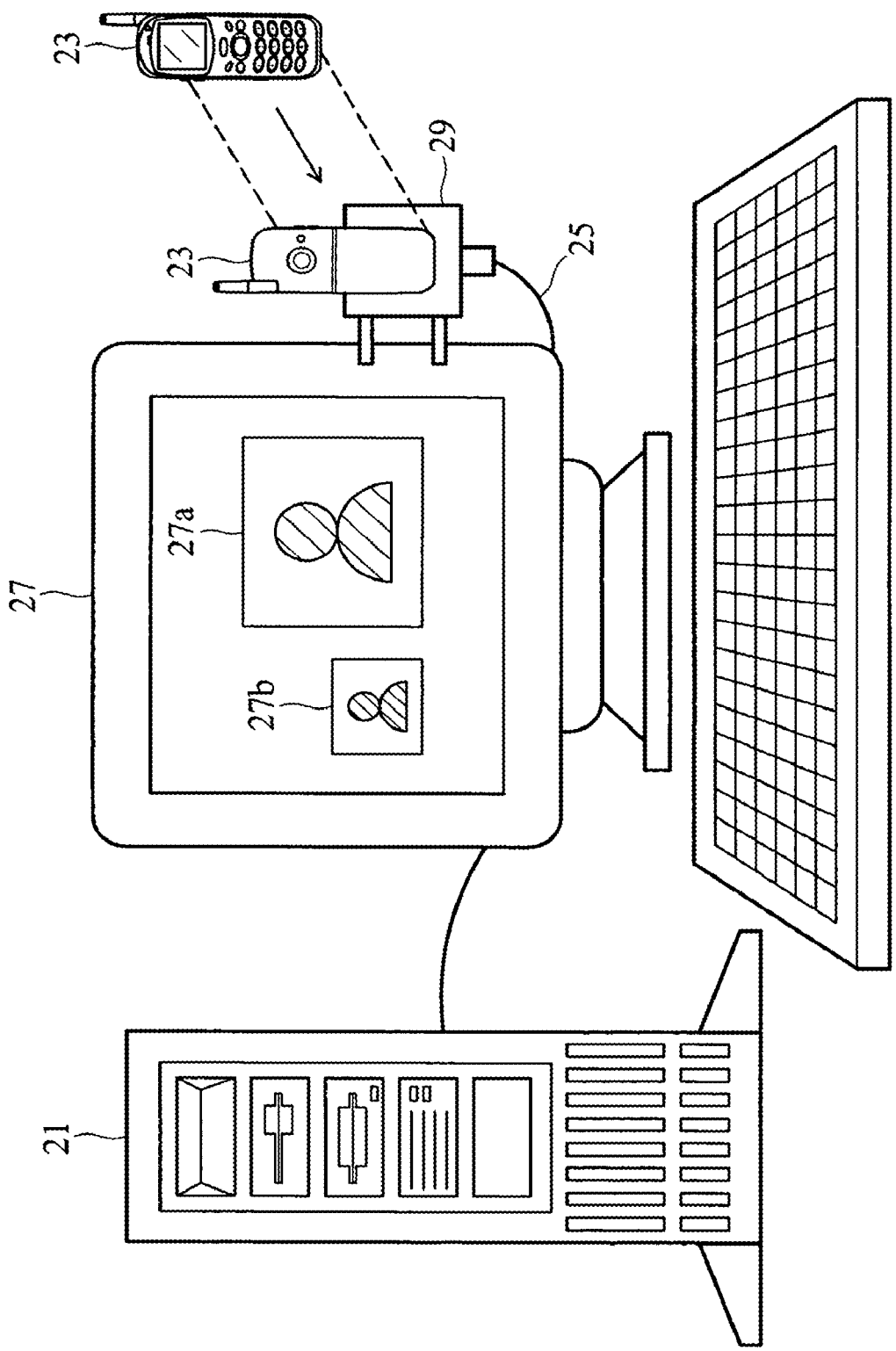
FIG. 2 is a diagram of an embodiment of a system comprising a computer host equipped with a mobile electronic device.

FIG. 2 is a diagram of an embodiment of a system comprising a computer host 21 equipped with a mobile electronic device 23 such as a mobile phone, smart phone or similar, providing webcam functions. A base 29 is provided to support the mobile electronic device 23 and enable easy placement in a relevant place to facilitate focusing on and capturing images of a user by the mobile electronic device 23. The base 29 and mobile electronic device 23 may provide various connection ports such as serial ports and parallel ports, for connection therebetween via wires 25. A serial port, such as a RS232, RS242, Serial ATA (SATA), Universal Serial Bus (USB), IEEE 1394 port or similar, is an interface on a computer system by which information is transferred in or out one bit at a time. A parallel port, such as an Integrated Drive Electronics (IDE), Small Computer System Interface (SCSI), IEEE 1284 port or similar, is an interface on a computer system where data is transferred in or out in parallel, that is, on more than one wire. A parallel port carries one bit on each wire thus multiplying the transfer rate obtainable over a single cable (contrast serial port). There are usually several extra wires on the parallel port that are used for control signals to indicate when data is ready to be sent or received. Those skilled in the art will realize that the base 29 and mobile electronic device 23 may provide wireless transmitters and receivers compatible with 802.x, Bluetooth, IrDA (Infrared Data Association) or similar, for connection therebetween. Webcam software executed by the computer host 21 may provide two windows 27a and 27b for live image display, the window 27a displaying images showing a remote user, and the window 27b displaying images showing a user captured by the mobile electronic device 23. The windows 27a and 27b may be handled by a peer-to-peer (P2P) communication application such as Microsoft MSN Messenger, Yahoo! Messenger, Skype or similar to interact with a corresponding P2P communication application resident on a remote computer host. Moreover, those skilled in the art will understand that some embodiments of the computer host 21 may be practiced with other computer system configurations, including handheld devices, multiprocessor-based, microprocessor-based or programmable consumer electronics, notebooks and the like.

Figure 3:
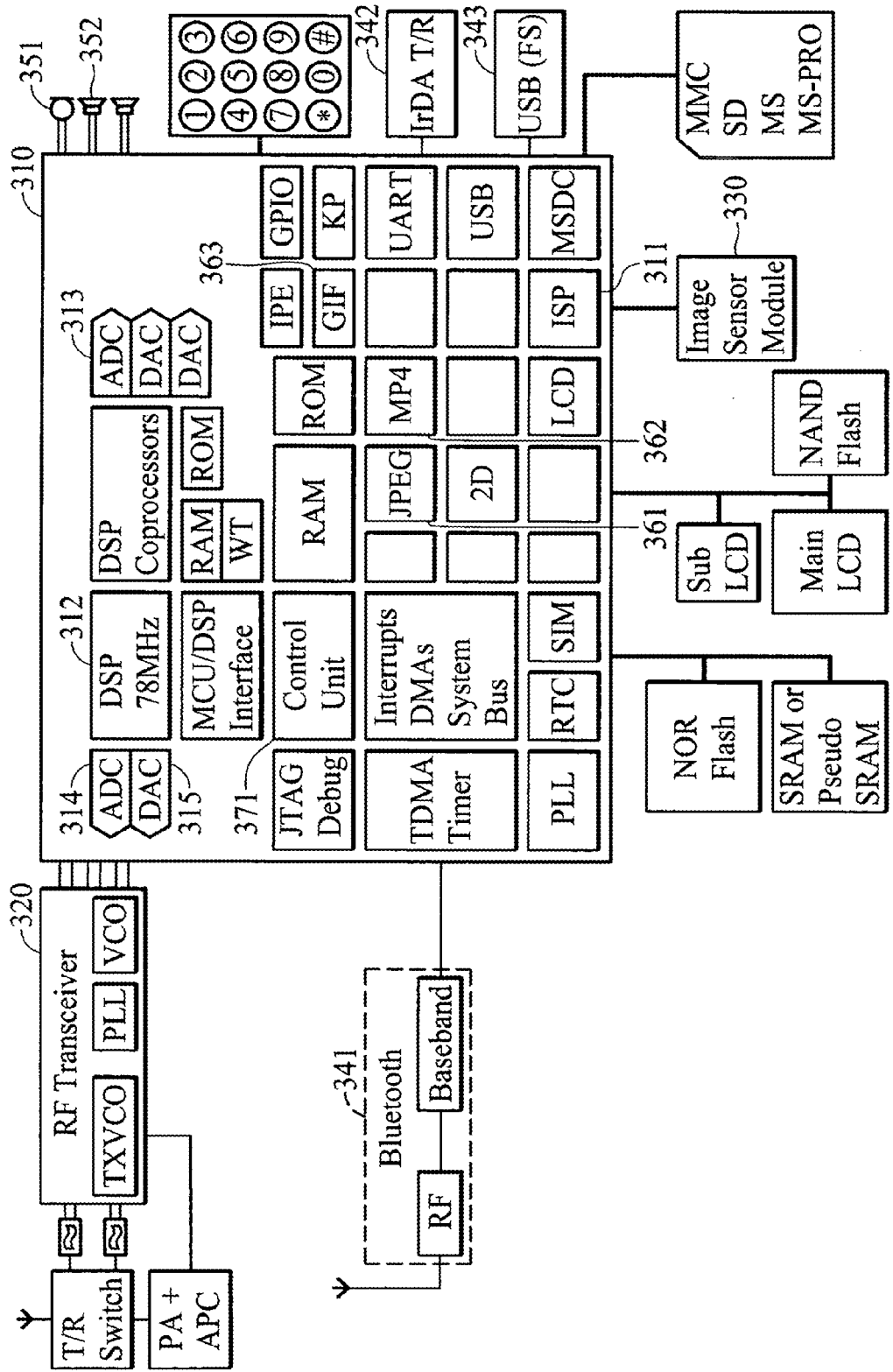
FIG. 3 is a diagram of the hardware architecture of an embodiment of a mobile phone.

FIG. 3 is a diagram of the hardware architecture of an embodiment of a mobile phone basically comprising a GPRS baseband 310, a radio frequency (RF) transceiver 320, an image sensor module 330, a Bluetooth communication unit 341, an IrDA transmitter/receiver 342, a USB communication unit 343, a microphone 351 and a speaker 352. The image sensor module 330 coupled to the GPRS baseband 310 may comprise multiple charge couple device (CCD) image sensors, complementary metal oxide semiconductor (CMOS) image sensors or similar to record the intensity of light as variable charges. In order to convert the content of the image sensor module 330 to a digital format, an image signal processor (ISP) 311 quantifies the variable charge into a discrete number of colors. A bitmap image contains numerous pixel data quantified by the ISP 311 in a given resolution such as 640×480, 1024×768 and so on. The bitmap image may be further converted into a compressed format by an image encoder such as a Joint Photographic Experts Group (JPEG) encoder 361, Graphics Interchange Format (GIF) encoder 363 or similar to generate a compressed image such as a JPEG, GIF image or similar. The bitmap images may be encoded by a Moving Pictures Experts Group-4 (MP4) encoder 362 or similar to generate a series of encoded frames such as I-, P- and B-frames. The generated display objects such as bitmap, JPEG, GIF images, I-, P-, B-frames or others, are continuously and serially transmitted to the computer host 21 (FIG. 2) via a transport unit such as the Bluetooth communication unit 341, IrDA transmitter 342, USB communication unit 343, or similar. Also, the generated display objects can be transmitted to a remote mobile station via a wireless network. Furthermore, in some embodiments, the mobile phone may also transmit the generated display objects to a remote mobile phone via a cellular network.

An analog-to-digital converter (ADC) 313 analyzes continuous real-world sound signals received from the microphone 351 and convert the analyzed signals from an analog to a digital form. A DSP 312 may organize the converted digital signals to generate well-known pulse code modulation (PCM) data objects, raw digital audio samples. Alternatively, the DSP 312 may organize and compress the converted digital signals to generate well-known adaptive multi-rate (AMR) data objects or similar to save transmission bandwidth. The generated acoustic objects such as PCM, AMR data objects or others are continuously and serially transmitted to the computer host 21 via the transport unit. Also, the generated acoustic objects can be transmitted to a remote mobile station via a wireless network. Furthermore, in some embodiments, the generated acoustic objects may also be converted into analog sound signals by the digital signal processor (DSP) 312 and digital-to-analog converters (DACs) 314, and then the converted analog sound signals are transmitted to a remote mobile station via the cellular network.

Figure 4:
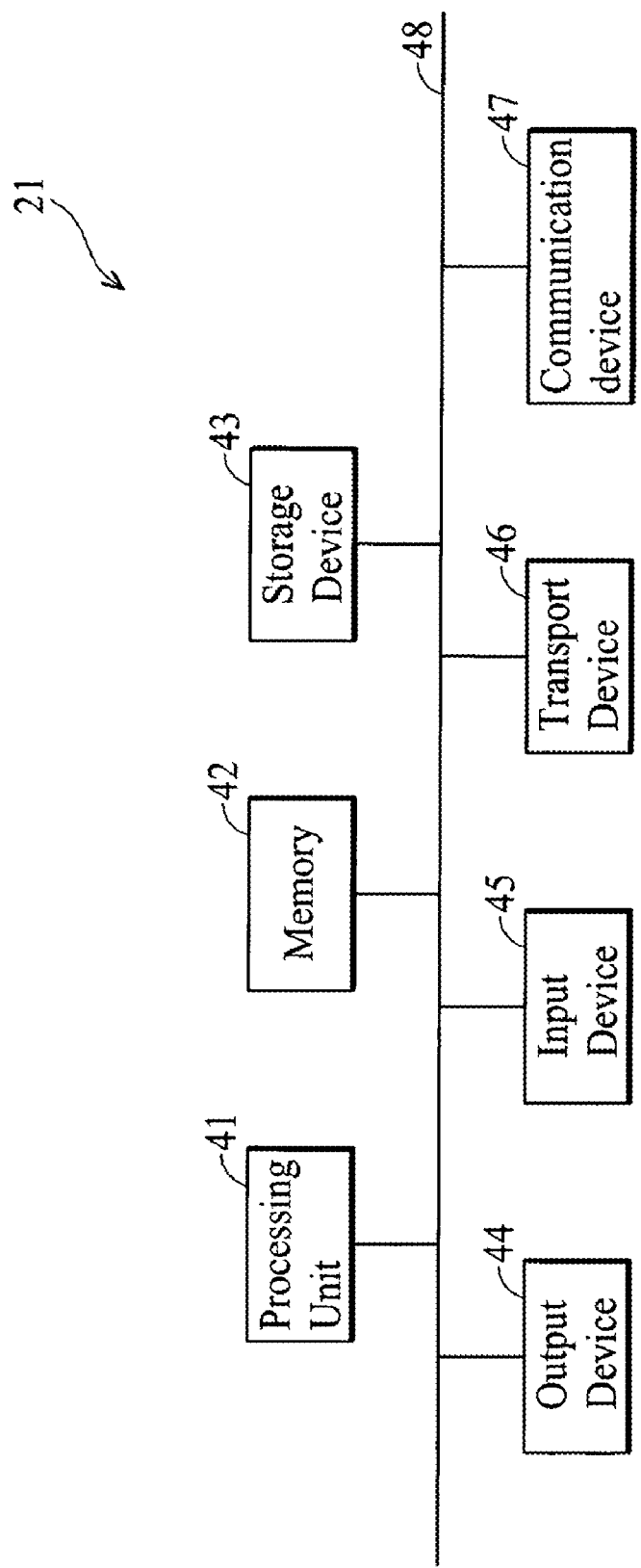
FIG. 4 is a diagram of a hardware environment applicable to an embodiment of a computer host.

FIG. 4 is a diagram of a hardware environment applicable to an embodiment of the computer host 21 (FIG. 2), comprising a processing unit 41, a memory 42, a storage device 43, an output device 44, an input device 45, a transport device 46 and a communication device 47. The processing unit 41 is connected by bus 48 to the memory 42, storage device 43, output device 44, input device 45, transport device 46 and communication device 47 based on Von Neumann architecture. Generally, program modules include routines, programs, objects, components, scripts, Web pages, or others, that perform particular tasks or implement particular abstract data types. The storage device 43 may be a flash memory, a memory card, a hard drive, magnetic drive, optical drive, portable drive, or nonvolatile memory drive. The storage device 43 provides nonvolatile storage for computer-readable instructions, data structures and program modules. The transport device 46 coupling to the base 29 (FIG. 2) may be the described serial port, parallel port or wireless transmitter and receiver. The communication device such as an Ethernet adapter, wireless communication adapter, asymmetric digital subscriber line (ADSL) modem or similar connects to a Internet Protocol (IP) network.

Figure 5:
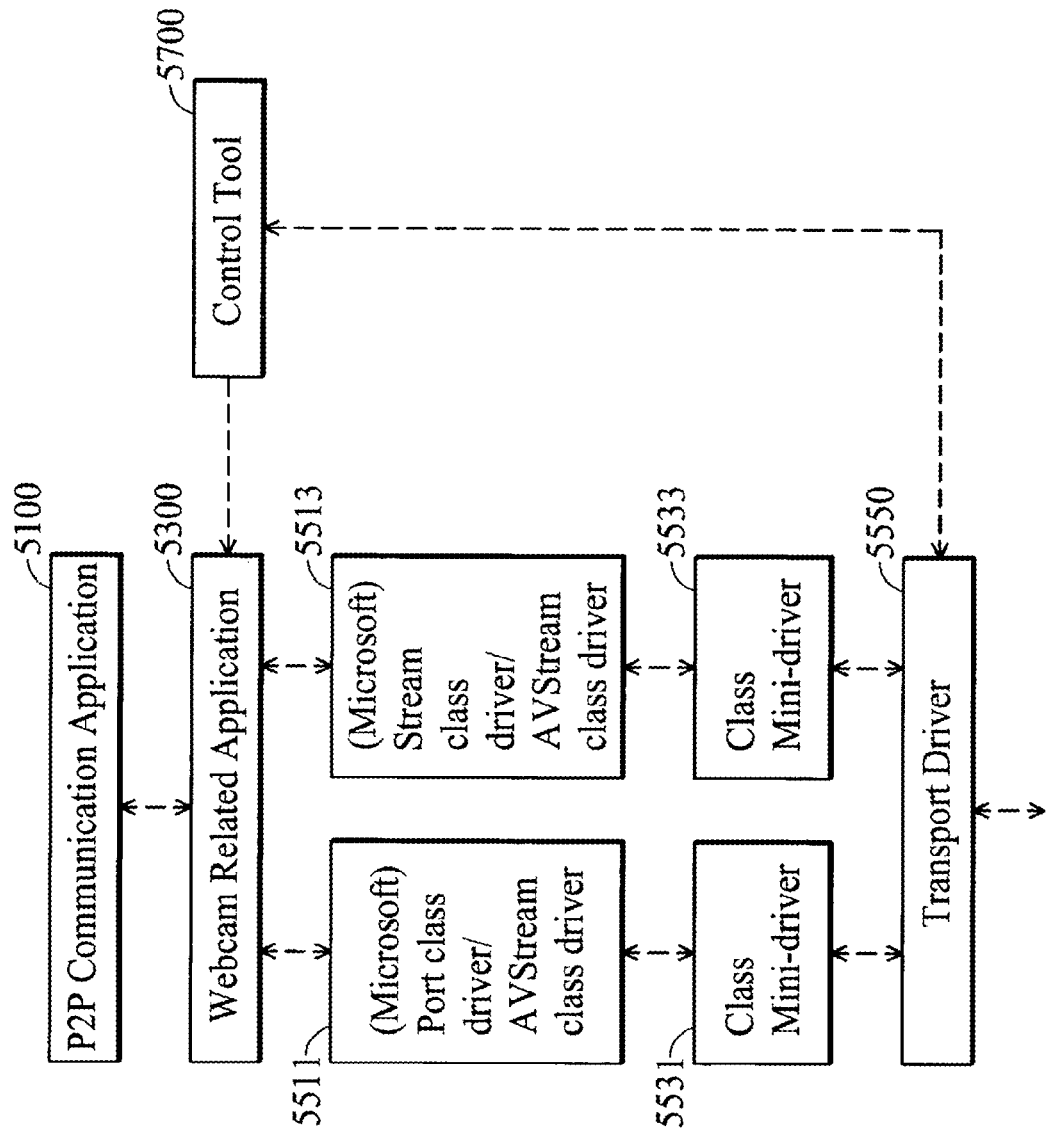
FIG. 5 is a diagram of the software architecture of an embodiment of program modules executed by a processing unit of a computer host.

FIG. 5 is a diagram of the software architecture of an embodiment of program modules executed by the processing unit 41 of the computer host 21 (FIG. 4). A P2P communication application 5100 interacts with a corresponding P2P communication application resident on a remote computer host to transmit/receive image raw data (or compressed image data) and/or audio raw data (or compressed audio data) therebetween. A webcam related application 5300 receives/transmits acoustic objects from/to the mobile phone 23 (FIG. 2) through the Port class driver (or AVStream class driver) 5511 provided by Microsoft, a class mini-driver 5531 and a transport driver 5550. Those skilled in the art will realize that the P2P communication application 5100 and the webcam related application 5300 may be programmed as two separate applications or as one combined application package. Also, those skilled in the art will realize that, when a USB communication device is used, the implementation of the class mini-driver 5531 may follow "USB device class definition for audio devices release 1.0" introduced in Mar. 18, 1998. The webcam related application 5300 receives/transmits display objects from/to the mobile phone 23 (FIG. 2) through the Stream class driver (or AVStream class driver) 5513 provided by Microsoft, a class mini-driver 5533 and the transport driver 5550. Those skilled in the art will realize that, when a USB communication device is used, the implementation of the class mini-driver 5533 may follow "USB device class definition for video devices revision 1.0a" introduced in Nov. 3, 2003. The control tool 5700 controls the mobile phone 23 by issuing various AT commands to perform particular operations such as detecting whether an incoming call is received, detecting whether a short message is received, configuring operating parameters for various electronic devices or similar, through corresponding firmware. Those skilled in the art will realized that "3GPP TS 27.007 V3.13.0" introduced in March 2003 provides numerous standard AT commands. Moreover, those skilled in the art may also issue additional proprietary AT commands to interact with various electronic devices embedded in the mobile phone 23 through relevant firmware. Referring to FIG. 2, as the mobile electronic device 23 operates as a webcam installed in the base 29 by users. An operating system resident on the computer host 21 detects a new hardware device (i.e. the mobile electronic device 23) has been plugged in, and automatically identifies that the detected hardware device is a webcam via various identification protocols (preferably universal plug and play, UPnP). The mobile electronic device 23 preferably supports UPnP specifications as set forth by the UPnP Forum (www.upnp.org) in order to be configured automatically by software without manual intervention. Note that the mobile electronic device 23 may further provide external data storage functions like a portable drive, and after detecting the mobile electronic device 23 connected, the computer host 21 may query the user for acquiring a reply indicating whether the mobile electronic device 23 is operated as a webcam or a portable drive.

Figure 6:
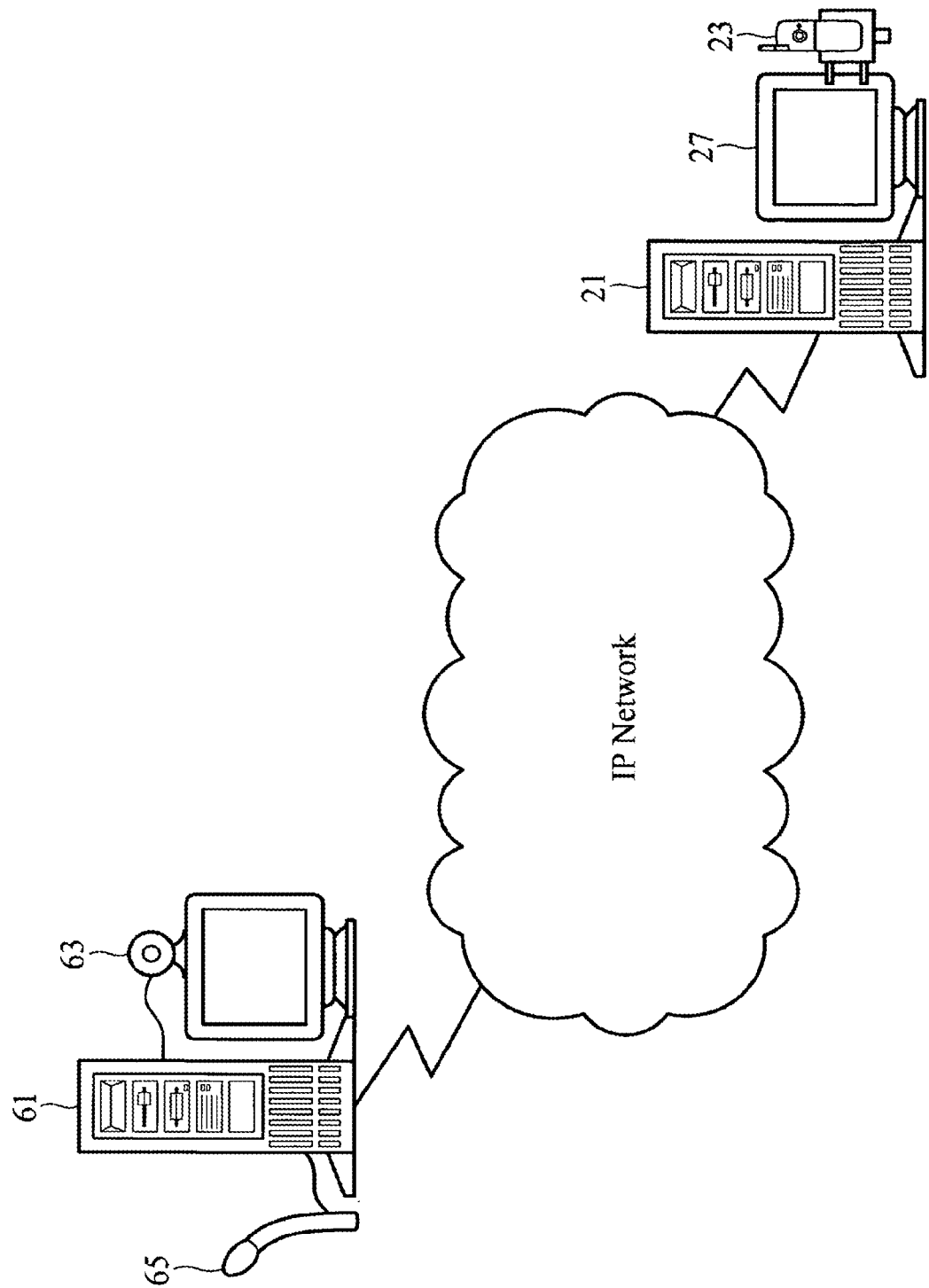
FIG. 6 is a diagram of data communication between two parties through an Internet protocol (IP) network.

FIG. 6 is a diagram of data communication between two parties through an IP network. A peer-to-peer (P2P) communication application resident on the computer host 21, such as Microsoft MSN Messenger, Yahoo! Messenger, Skype or similar, acquires display and acoustic data objects via the detected mobile electronic device 23 and transmits the acquired objects to another P2P communication application resident on a remote electronic apparatus/device 61 such as a personal computer, mobile phone, portable media player (PMP), PDA or similar, connected to an internet protocol (IP) network such as a local area network (LAN), wireless LAN, Internet or similar. The remote electronic apparatus/device 61 equipped with a webcam 63 and a microphone 65 continuously acquires display objects corresponding to a remote user facing to the webcam 63 and acoustic objects and transmits the acquired display and acoustic objects to the P2P communication application resident on the computer host 21 through the IP network.

Figure 7A:
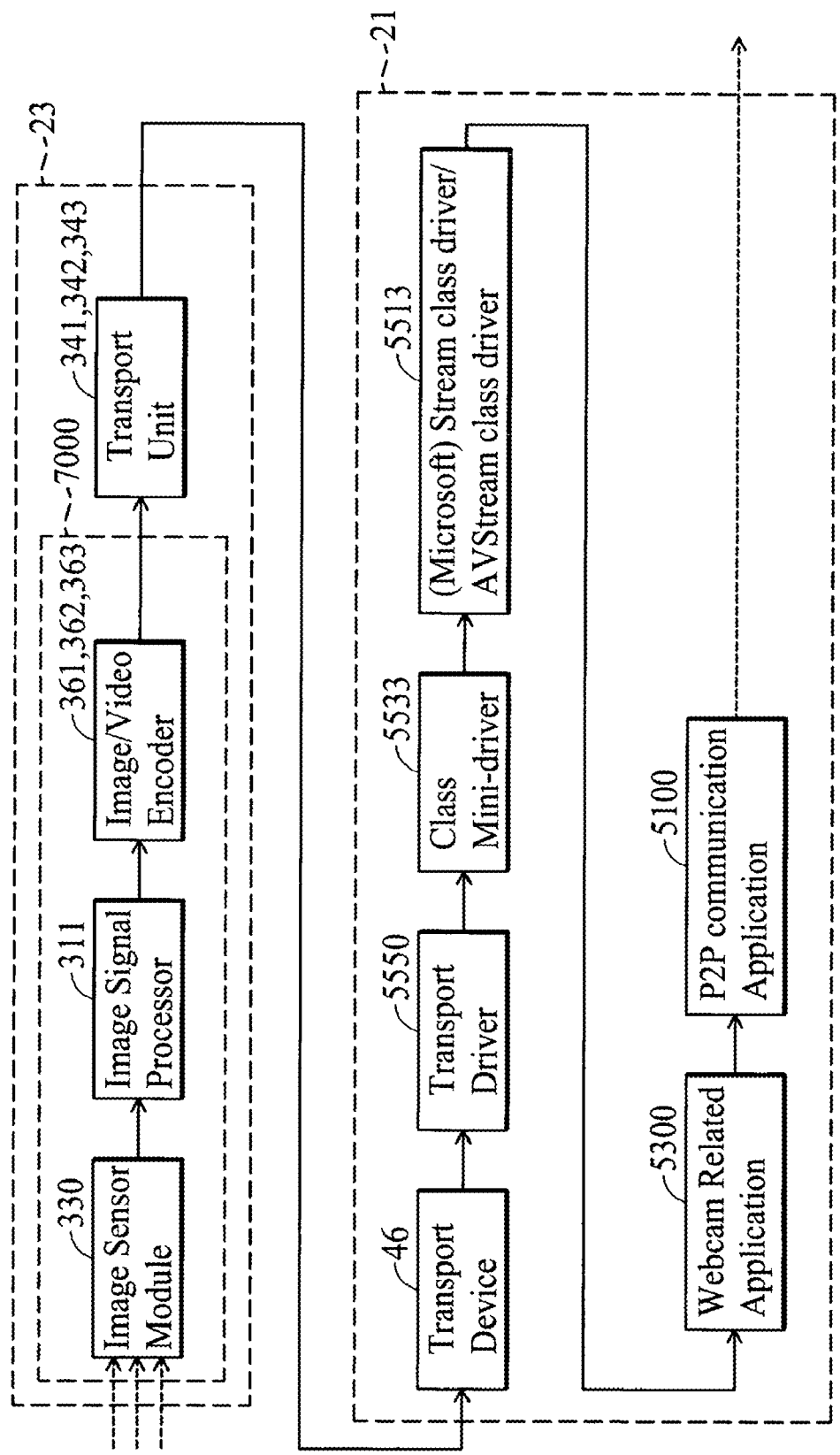
FIGS. 7a and 7b are diagrams of embodiments of pipelines for transmitting display objects from a mobile electronic device to a computer host.
Figure 7B:
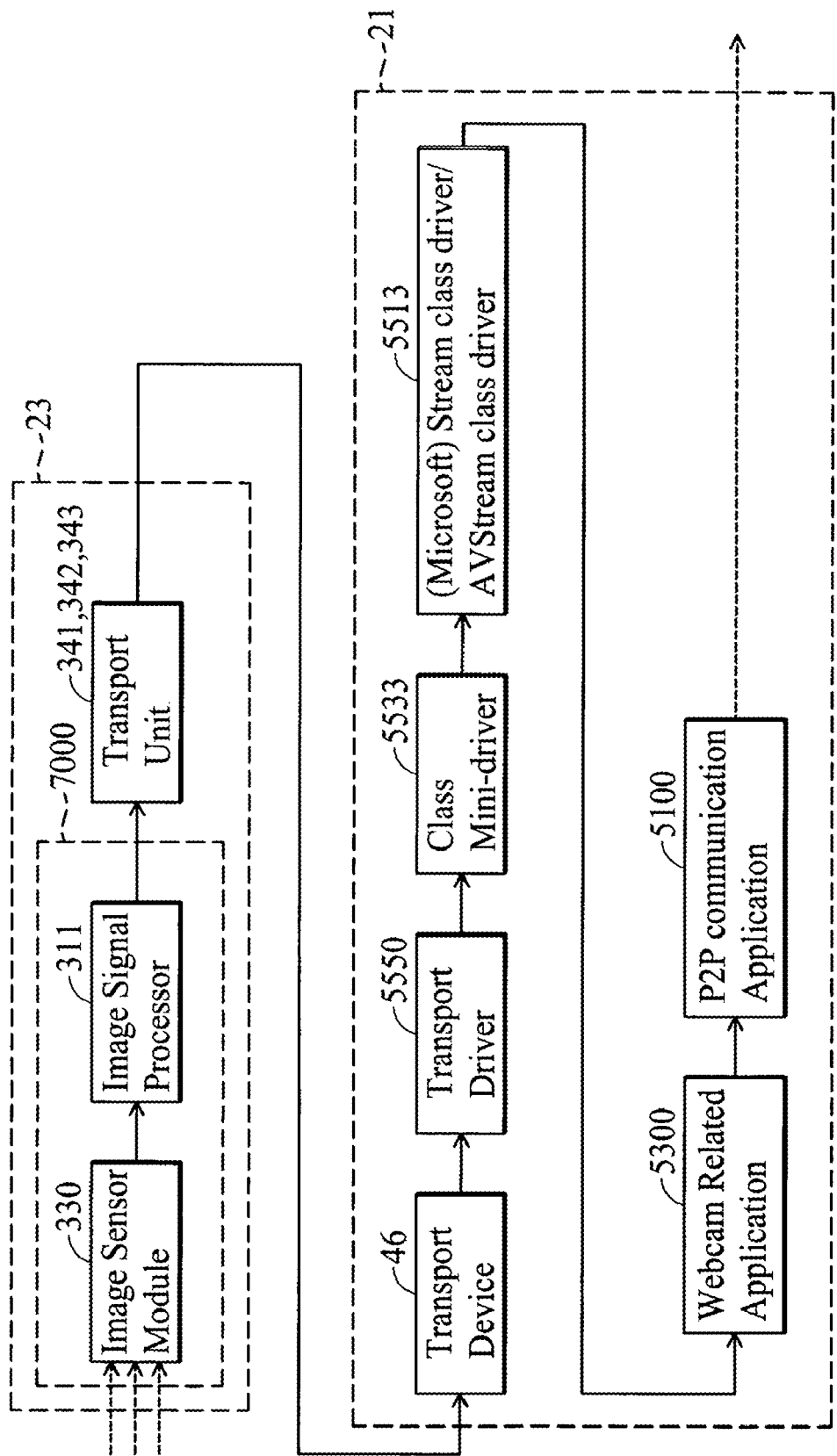

FIGS. 7a and 7b are diagrams of embodiments of pipelines for transmitting display objects from the mobile electronic device 23 (FIG. 2) to the computer host 21 (FIG. 2). Referring to FIG. 7a, an embodiment of a display object generation unit 7000 comprises the image sensor module 330, image signal processor 311 and an image/video encoder, which may be or may comprise the JPEG encoder 361, the MP4 encoder 362, the GIF encoder 363 or similar. A series of bitmap images are continuously generated through the image sensor module 330 and image signal processor 311. The image signal processor 311 may blend content such as text, symbols, graphic patterns into raw images detected by the image sensor module 330 or adjust image parameters of the raw images, such as color temperature, contrast or similar, to generate bitmap images. The generated bitmap images are encoded in a particular format by an image/video encoder, which may be the JPEG encoder 361 (FIG. 3), MP4 encoder 362 (FIG. 3) or GIF encoder 363 (FIG. 3) to generate a series of display objects, which may be JPEG, GIF images, I-, P-, B-frames. The Bluetooth communication unit 341 (FIG. 3), IrDA transmitter 342 (FIG. 3) or USB communication unit 343 (FIG. 3) may be configured to transmit the generated display objects. The JPEG encoder 361, MP4 encoder 362 or GIF encoder 363 may be selected to encode the bitmap images, at a particular compression rate, contingent upon transmission ability of the configured transport unit, such as transmission rate. Note that, when the transmission ability of the configured transport unit is high, the bitmap images may be directly transmitted to the computer host 21 without encoding. The JPEG encoder 361, MP4 encoder 362 or GIF encoder 363 may merge textual data or image data into each original bitmap image and encode the merged bitmap images to generate display objects. For example, textual data corresponding to a nickname of a user may be merged into the original bitmap image, enabling the remote electronic apparatus/device 61 (FIG. 6) to play the generated display objects with the nickname. The generated display objects are serially transmitted to the transport device 46 via the configured transport unit such as the Bluetooth communication unit 341, IrDA transmitter 342 or USB communication unit 343. The P2P communication application 5100 (FIG. 5) directly receives the generated display objects through the transport driver 5550 (FIG. 5), class mini-driver 5533 (FIG. 5), stream class driver/AV Stream class driver 5513 (FIG. 5) and webcam related application 5300 (FIG. 5), and transmits the display objects to a remote P2P communication application via an IP network.

Referring to FIG. 7b, an embodiment of a display object generation unit 7000 comprises the image sensor module 330 and image signal processor 311. A series of bitmap images are continuously generated through the image sensor module 330 (FIG. 3) and image signal processor 311 (FIG. 3). The generated bitmap images are serially transmitted to the transport device 46 (FIG. 4) via a transport unit, which may be the Bluetooth communication unit 341 (FIG. 3), IrDA transmitter 342 (FIG. 3) or USB communication unit 343 (FIG. 3). The class mini-driver 5533 (FIG. 5) receives the bitmap images through the transport driver 5550 (FIG. 5) and encodes the bitmap images in a particular format by a proprietary image/video codec, which may be a JPEG codec, MP4 codec or GIF codec to generate a series of display objects such as JPEG, GIF images, I-, P-, B-frames. The P2P communication application 5100 (FIG. 5) receives the generated display objects through the class mini-driver 5533 (FIG. 5), stream class driver/AV Stream class driver 5513 (FIG. 5) and webcam related application 5300 (FIG. 5), and transmits the display objects to a remote P2P communication application via an IP network.

Figure 8A:
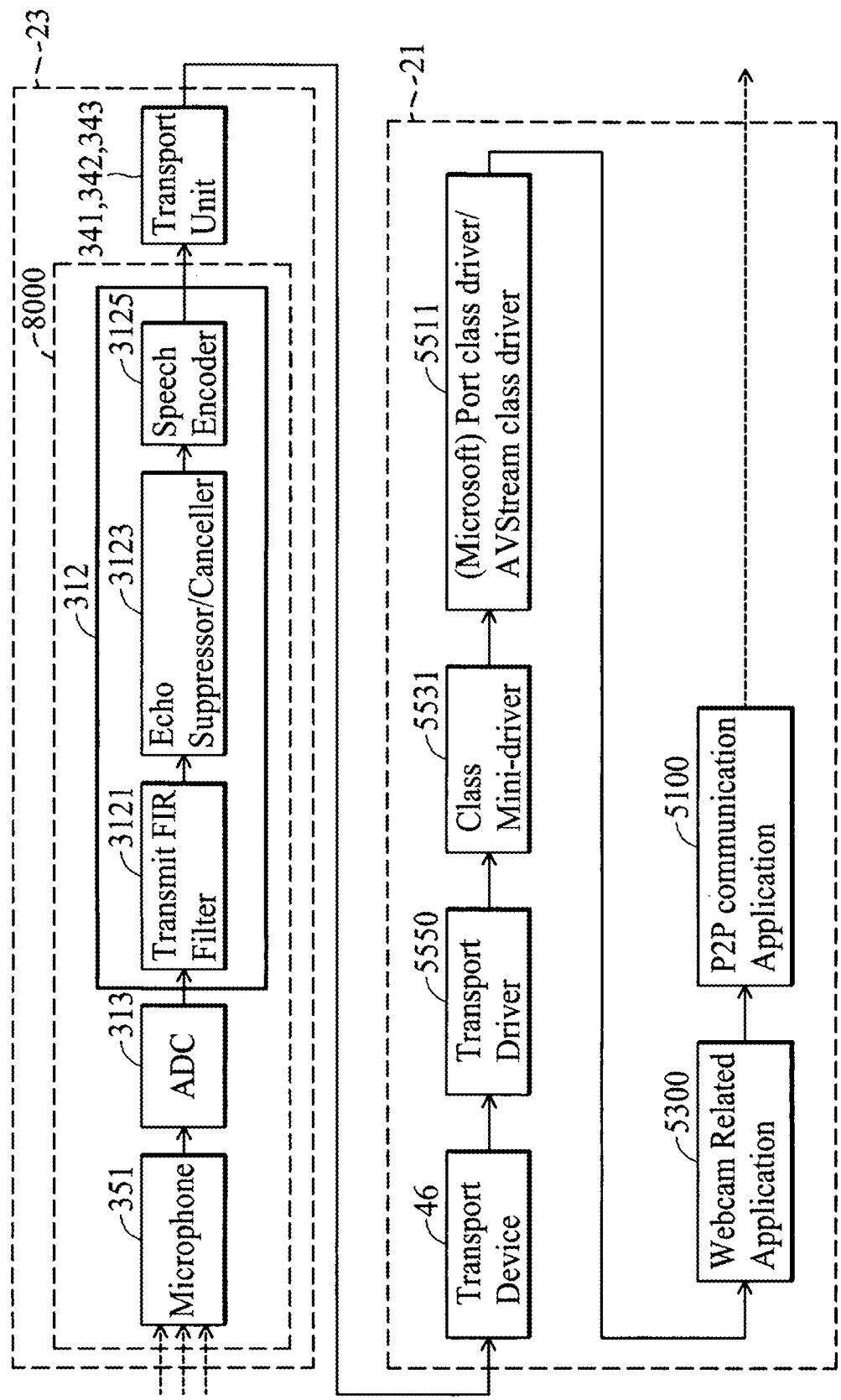
FIGS. 8a and 8b are diagrams of embodiments of pipelines for transmitting acoustic objects from a mobile electronic device to a computer host.
Figure 8B:
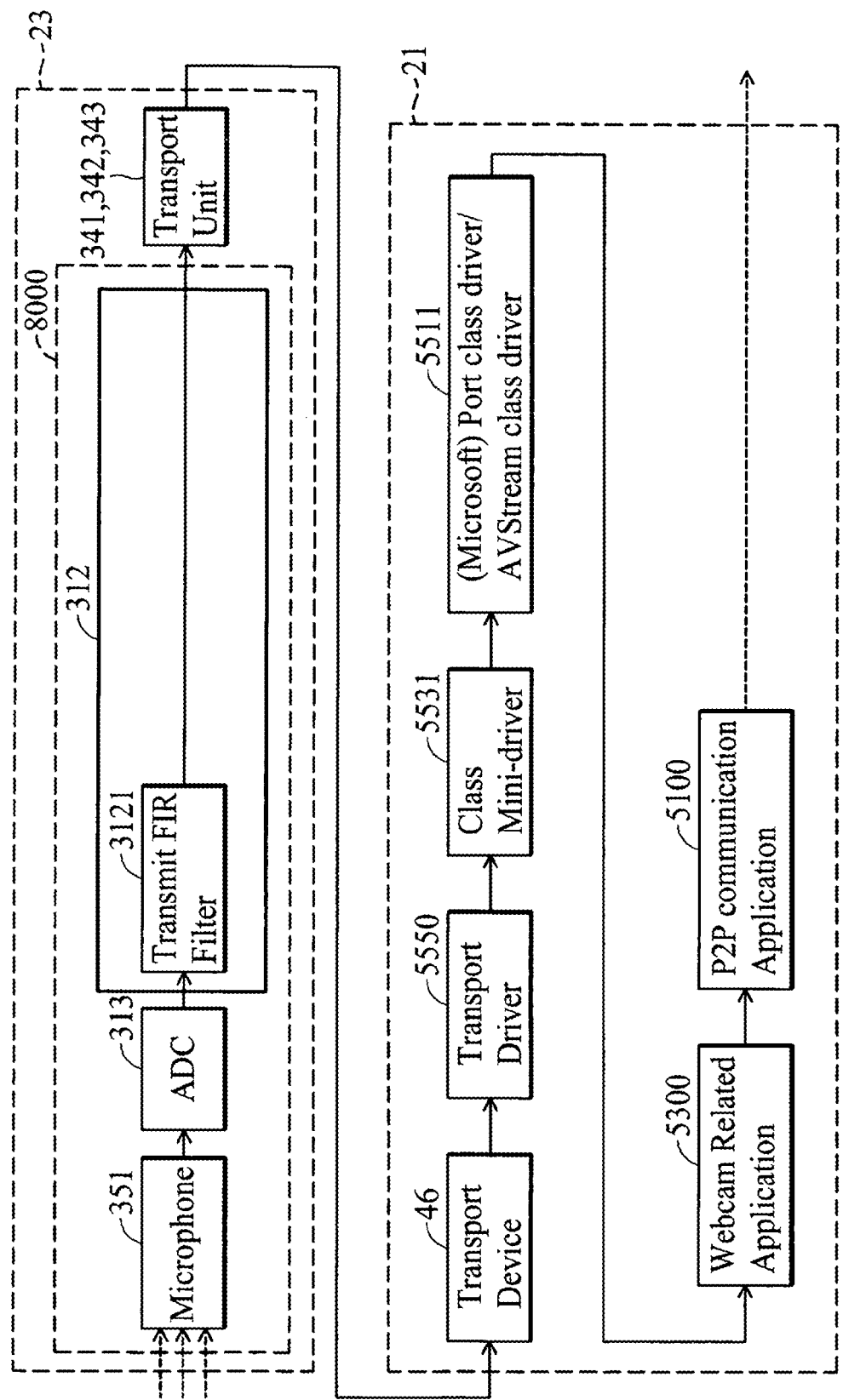

FIGS. 8*a* and 8*b* are diagrams of embodiments of pipelines for transmitting acoustic objects from the mobile electronic device 23 (FIG. 2) to the computer host 21 (FIG. 2). Referring to FIG. 8*a*, an embodiment of an acoustic data generation unit 8000 comprises microphone 351, ADC 313 and DSP 312. The ADC 313 amplifies signals received from the microphone 351 and converts the amplified signals from an analog to a digital form. The DSP 312 organizes and compresses the converted digital signals to generate well-known AMR data objects or similar. The DSP 312 comprises a transmitting finite impulse response (FIR) filter 3121, an echo suppressor/canceller 3123 and a speech encoder 3125. The output of the FIR filter 3121 to the converted digital signals may be calculated by convolving the input signal with the impulse response. The echo suppressor/canceller 3123 suppresses or cancels echoes to improve audio quality. The speech encoder 3125 encodes digital signals with various bit rates to generate AMR data objects. The bit rates may be following: 6.60, 8.85, 12.65, 14.25, 15.85, 18.25, 19.85, 23.05 and 23.85 kbit/s. The lowest bit rate providing excellent speech quality in a clean environment may be 12.65 kbit/s. Higher bit rates are useful in under with background noise and in the case of music. Note that the echo suppressor/canceller 3123 and speech encoder 3125 can be enabled or disabled by relevant AT commands. The Bluetooth communication unit 341 (FIG. 3), IrDA transmitter 342 (FIG. 3) or USB communication unit 343 (FIG. 3) may be configured to transmit the generated AMR data objects. The bit rates may be adjusted contingent upon the transmission ability of the configured transport unit, such as transmission rate. The generated AMR data objects are serially transmitted to the transport device 46 (FIG. 4) via a transport unit, which may be the Bluetooth communication unit 341 (FIG. 3), IrDA transmitter 342 (FIG. 3) or USB communication unit 343 (FIG. 3). The P2P communication application 5100 (FIG. 5) directly receives the acoustic objects through the transport driver 5550 (FIG. 5), class mini-driver 5531 (FIG. 5), port class driver/AV Stream class driver 5511 (FIG. 5) and webcam related application 5300 (FIG. 5), and transmits the acoustic objects to a remote P2P communication application via an IP network.

Referring to FIG. 8*b*, an embodiment of an acoustic data generation unit 8000 comprises the microphone 351, ADC 313 and DSP 312. The ADC 313 (FIG. 3) amplifies signals received from the microphone 351 (FIG. 3) and converts the amplified signals from analog to digital form. The DSP 312 (FIG. 3) organizes the converted digital signals to generate well-known Pulse Code Modulation (PCM) data objects. The generated PCM data objects are serially transmitted to the transport device 46 (FIG. 4) via a transport unit, which may be the Bluetooth communication unit 341 (FIG. 3), IrDA transmitter 342 (FIG. 3) or USB communication unit 343 (FIG. 3). The class mini-driver 5531 (FIG. 5) receives the PCM data objects through the transport driver 5550 (FIG. 5), suppresses/cancels echoes therefrom by various echo suppressor/canceller techniques and encodes PCM data objects to generate AMR data objects by various speech encoding techniques. The P2P communication application 5100 (FIG. 5) receives the generated acoustic objects through the class mini-driver 5531 (FIG. 5), port class driver/AV Stream class driver 5511 (FIG. 5) and webcam related application 5300 (FIG. 5), and transmits the acoustic objects to a remote P2P communication application via an IP network.

FIG. 9 is a diagram of data communication among three parties through an IP network and a cellular network. A P2P communication application resident on the computer host 21, such as Microsoft MSN Messenger, Yahoo! Messenger, Skype or similar, acquires display and acoustic data objects via the detected mobile electronic device 23 and transmits the acquired objects to another P2P communication application resident on a remote electronic apparatus/device 61 such as a personal computer, mobile phone, PMP, PDA or similar, connecting to an IP network such as a local area network (LAN), wireless LAN, Internet or similar. The remote electronic apparatus/device 61 equipped with a webcam 63 and a microphone 65 continuously acquires display objects corresponding to a remote user facing to the webcam 63 and acoustic objects and transmits the acquired display and acoustic objects to the P2P communication application resident on the computer host 21 through the IP network. When the mobile electronic device 23 operates as a webcam, the mobile electronic device 23 may simultaneously receive incoming call requests, short messages, multimedia messages or others from a remote mobile electronic device 91 via a cellular network such as global system for mobile communications (GSM), enhanced data rates for global evolution (EDGE), code division multiple access (CDMA) network or similar.

Figure 10:
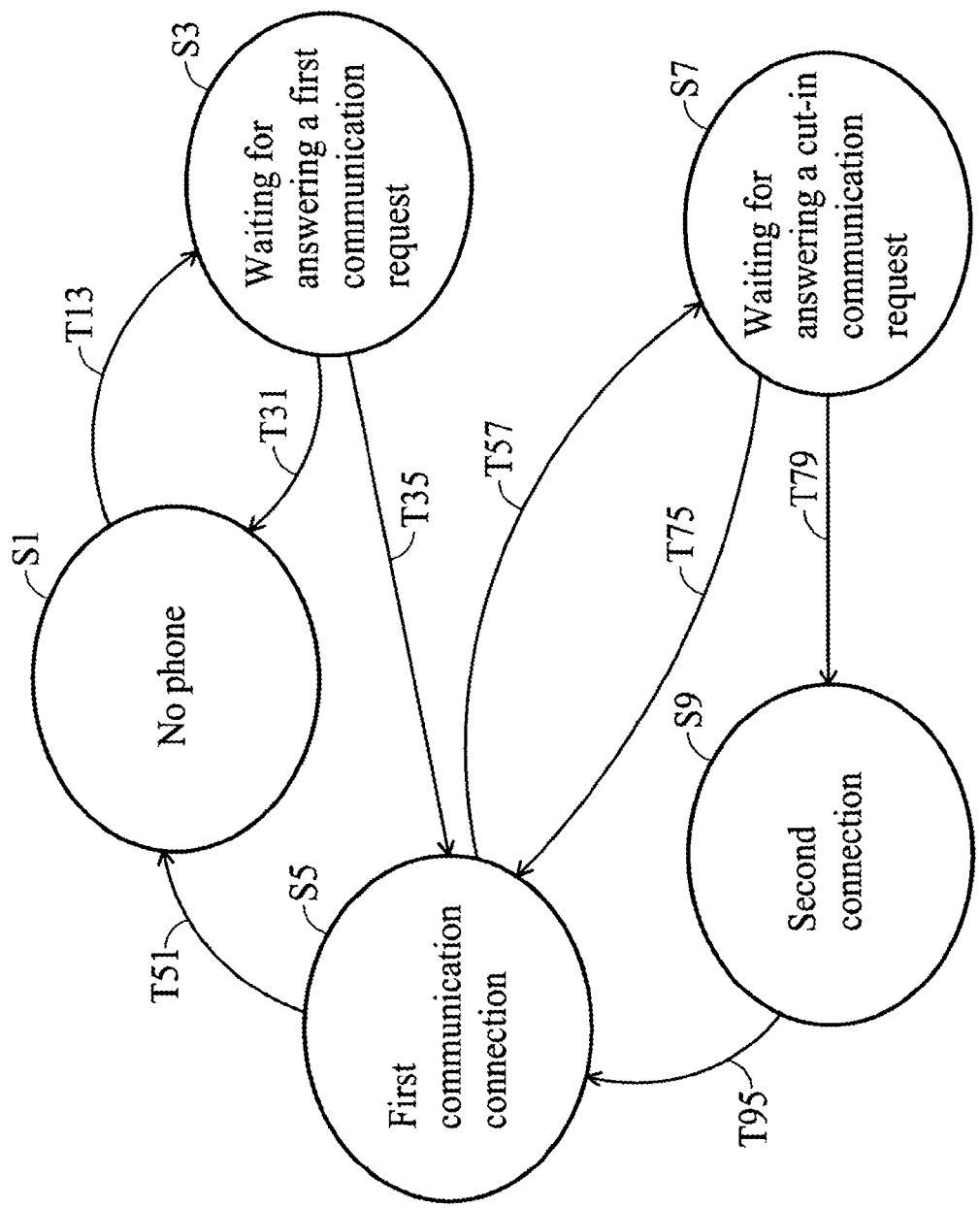
FIG. 10 is a diagram of an embodiment of a mobile communication finite state machine (FSM)

In order to periodically detect whether the mobile electronic device 23 receives incoming call requests, short message, multimedia messages or others from a remote mobile electronic device 91, a mobile communication finite state machine (FSM) is employed by the control tool 5700 (FIG. 5) to model mobile communication behavior composed of states, transitions and actions. FIG. 10 is a diagram of an embodiment of a mobile communication FSM, comprising five states such as no phone S1, waiting for answering a first communication request S3, first connection S5, waiting for answering a cut-in communication request S7 and second connection S9, and eight transitions T13, T31, T35, T51, T57, T75, T79 and T95.

Figure 11A:
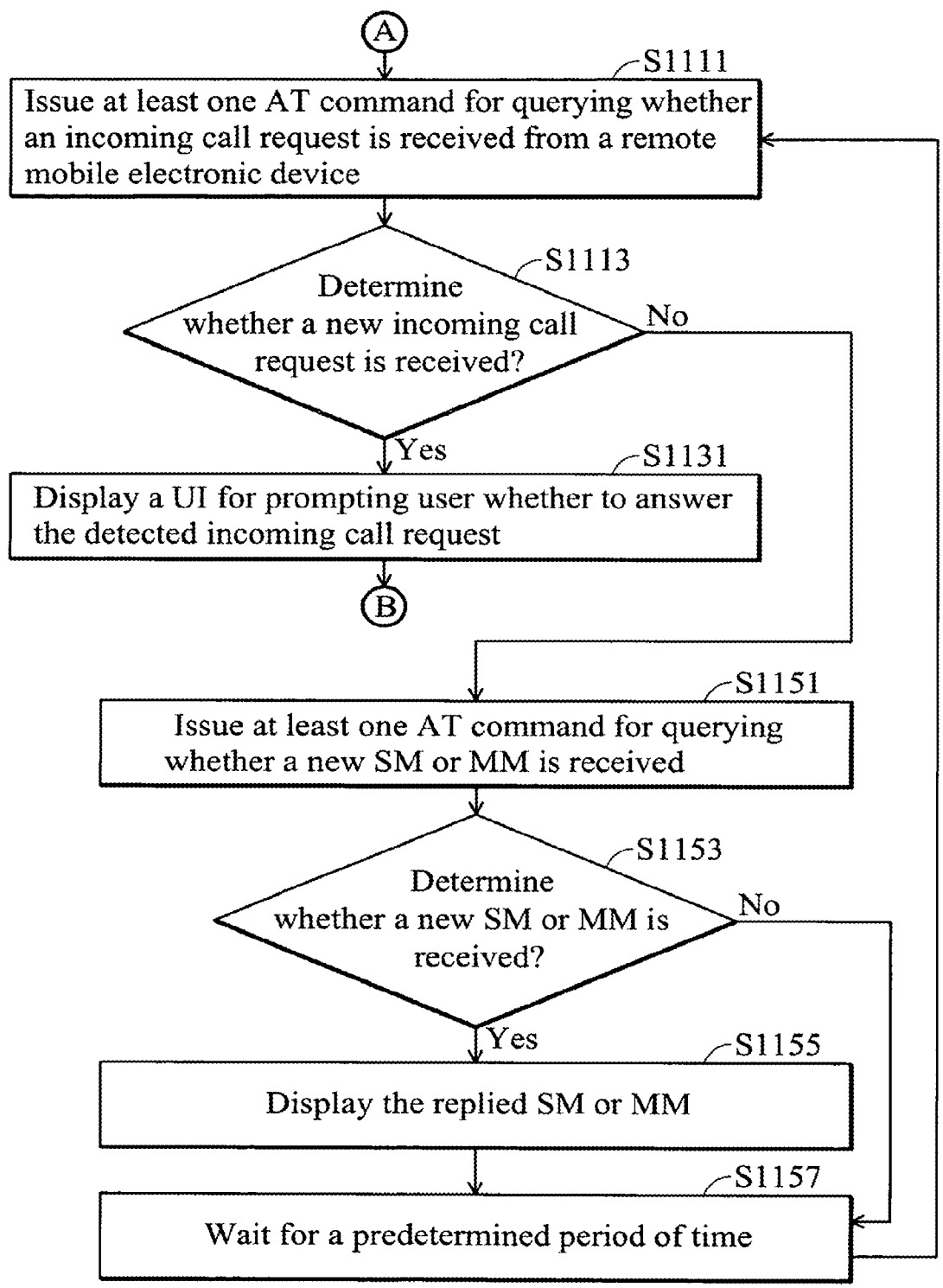
FIGS. 11a to 11e are flowcharts illustrating an embodiment of actions respectively performed in fives states.

FIGS. 11*a* to 11*e* are flowcharts illustrating an embodiment of actions respectively performed in the no phone state S1, waiting for answering a first communication request state S3, first connection state S5, waiting for answering a cut-in communication request state S7 and second connection state S9. Referring to FIG. 11*a*, in step S1111, at least one AT command is issued to the mobile electronic device 23 for querying whether an incoming call request is received from a remote mobile electronic device via a cellular network. In step S1113, it is determined whether a new incoming call request is received. If so, the process proceeds to step S1131, otherwise, to step S1151. It is determined that a new incoming call request is received when a reply message indicating that a new incoming call request has been received is received. Otherwise, it is determined that no new incoming call request is received when a reply message indicating that no new incoming call request has been received or when no reply message is received after a time-out expires. In step S1131, a user interface (UI) is displayed for prompting a user to answer the detected incoming call request or not. FIG. 12 is a diagram of an embodiment of a UI (user interface) for prompting a user to answer the detected incoming call request or not, comprising a prompting message M1200 and two buttons B121 and B123. Referring to FIG. 11*a*, in step S1151, at least one AT command is issued to the mobile electronic device 23 for querying whether a new short message (SM) or multimedia message (MM) is received. In step S1153, it is determined whether a new SM or MM is received. If so, the process proceeds to step S1155, otherwise, to step S1157. It is determined that a new SM or MM is received when a new SM or MM reply is received. Otherwise, it is determined that no new SM or MM reply is received when a reply message indicating that no new SM or MM has been received is received or that no reply message is received before a time-out expires. In step S1155, the replied SM or MM is displayed via a UI. Note that the SM or MM reply may also be stored in the storage device 43 (FIG. 4). In step S1157, a predetermined period of time elapses prior to the next incoming call request detection.

Figure 11B:
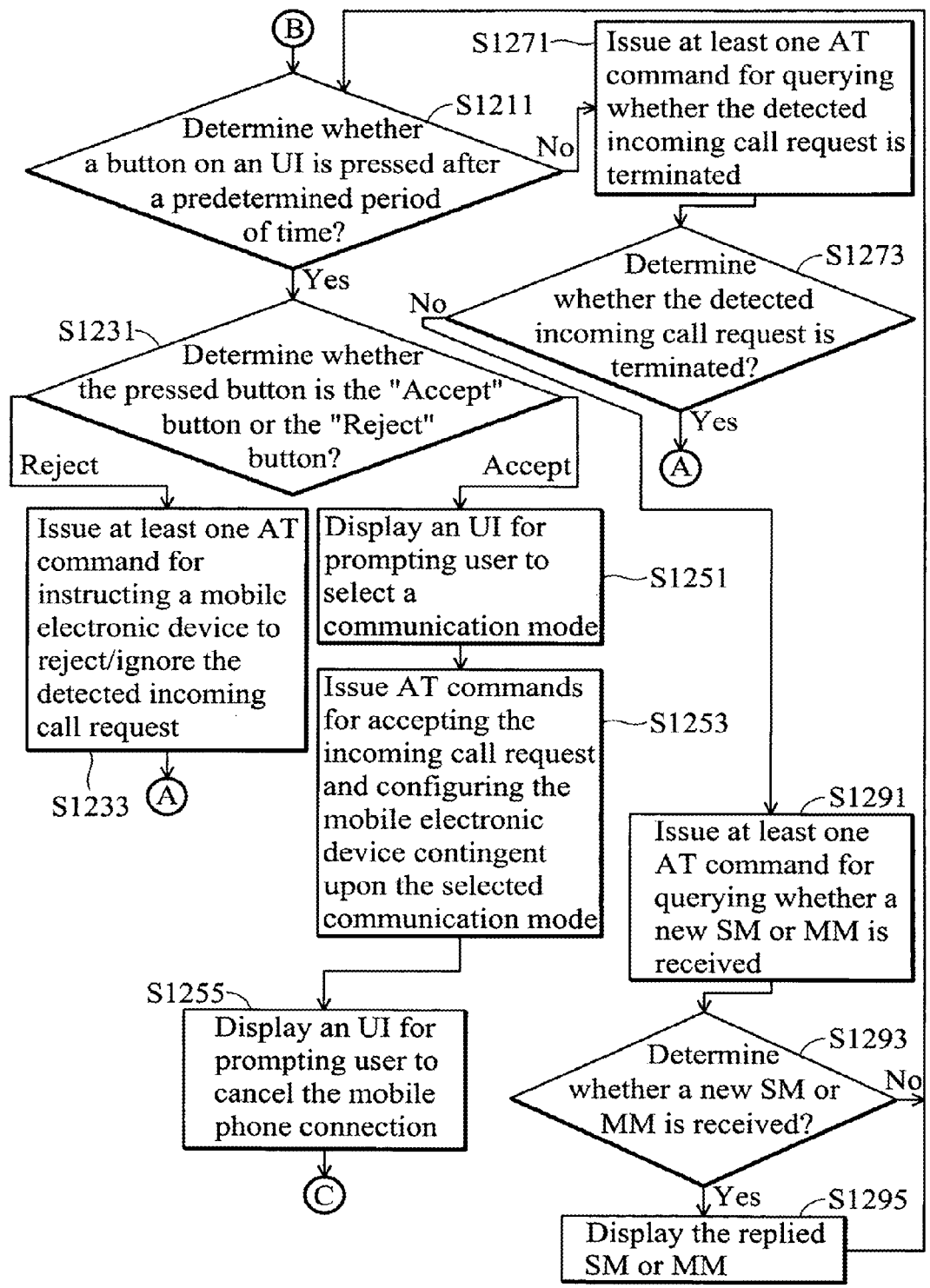
Figure 12:
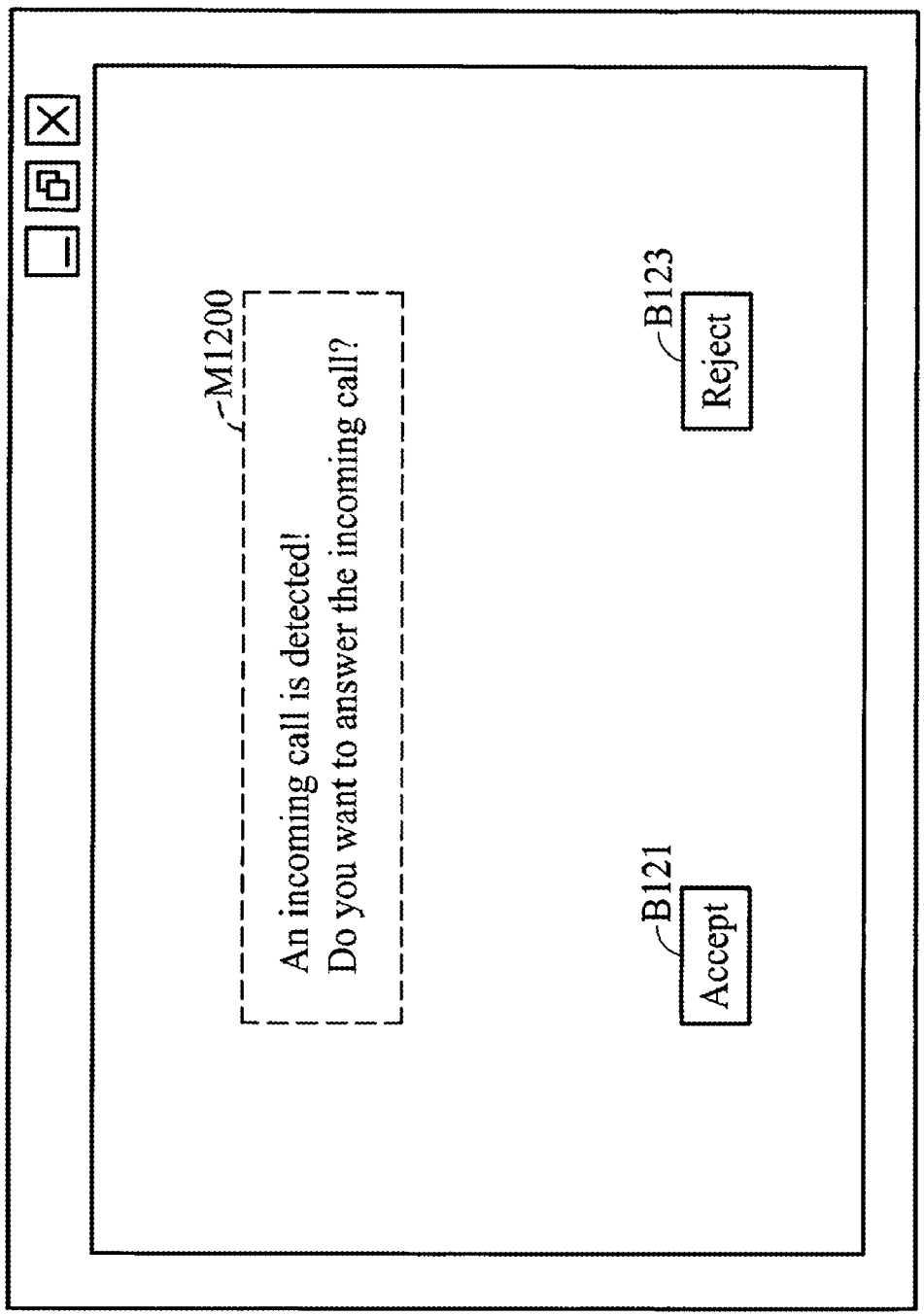
FIG. 12 is a diagram of an embodiment of a UI for prompting a user whether to answer the detected incoming call request.
Figure 13:
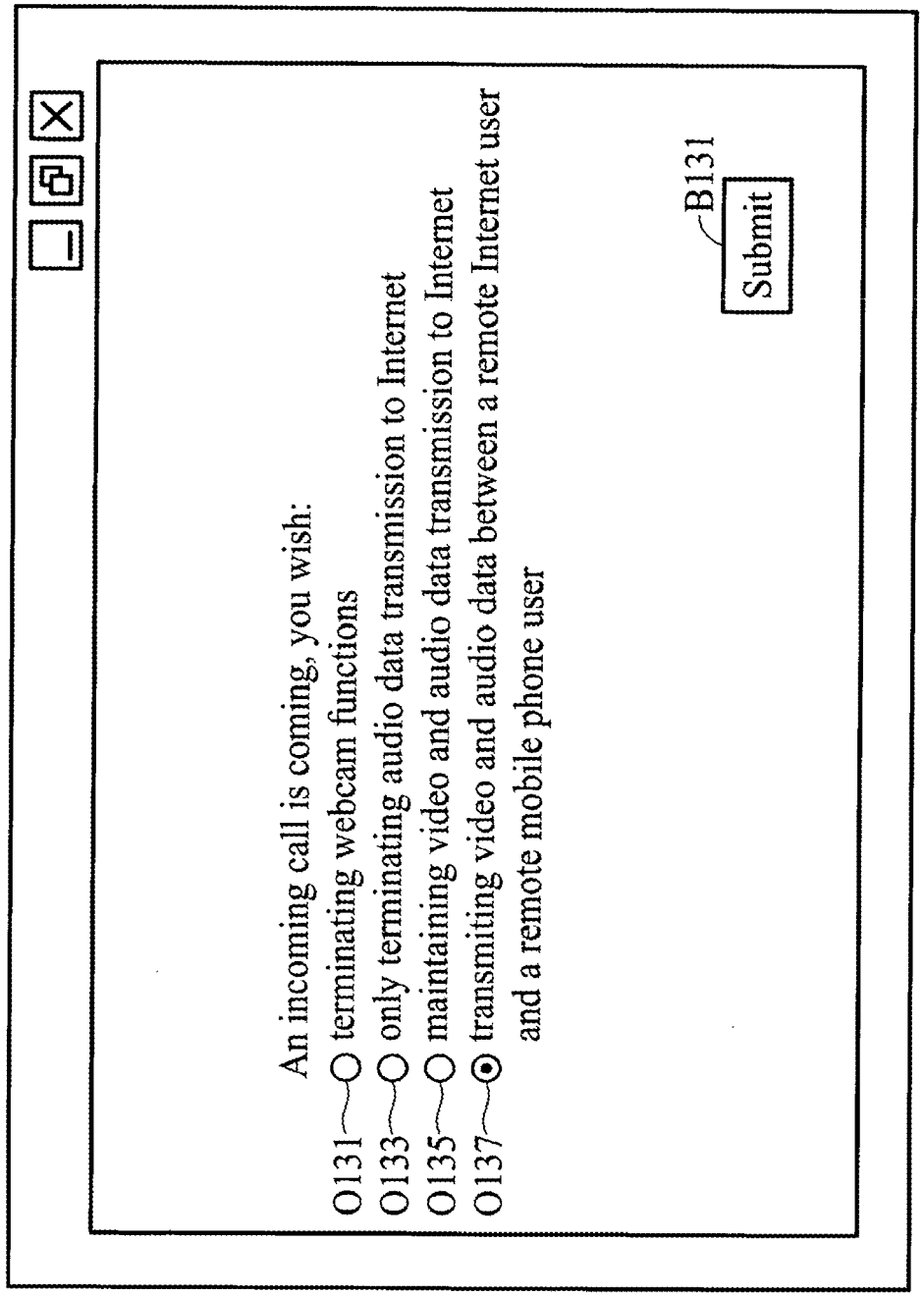
FIG. 13 is a diagram of an embodiment of a UI for prompting a user to select a communication mode.
Figure 14:
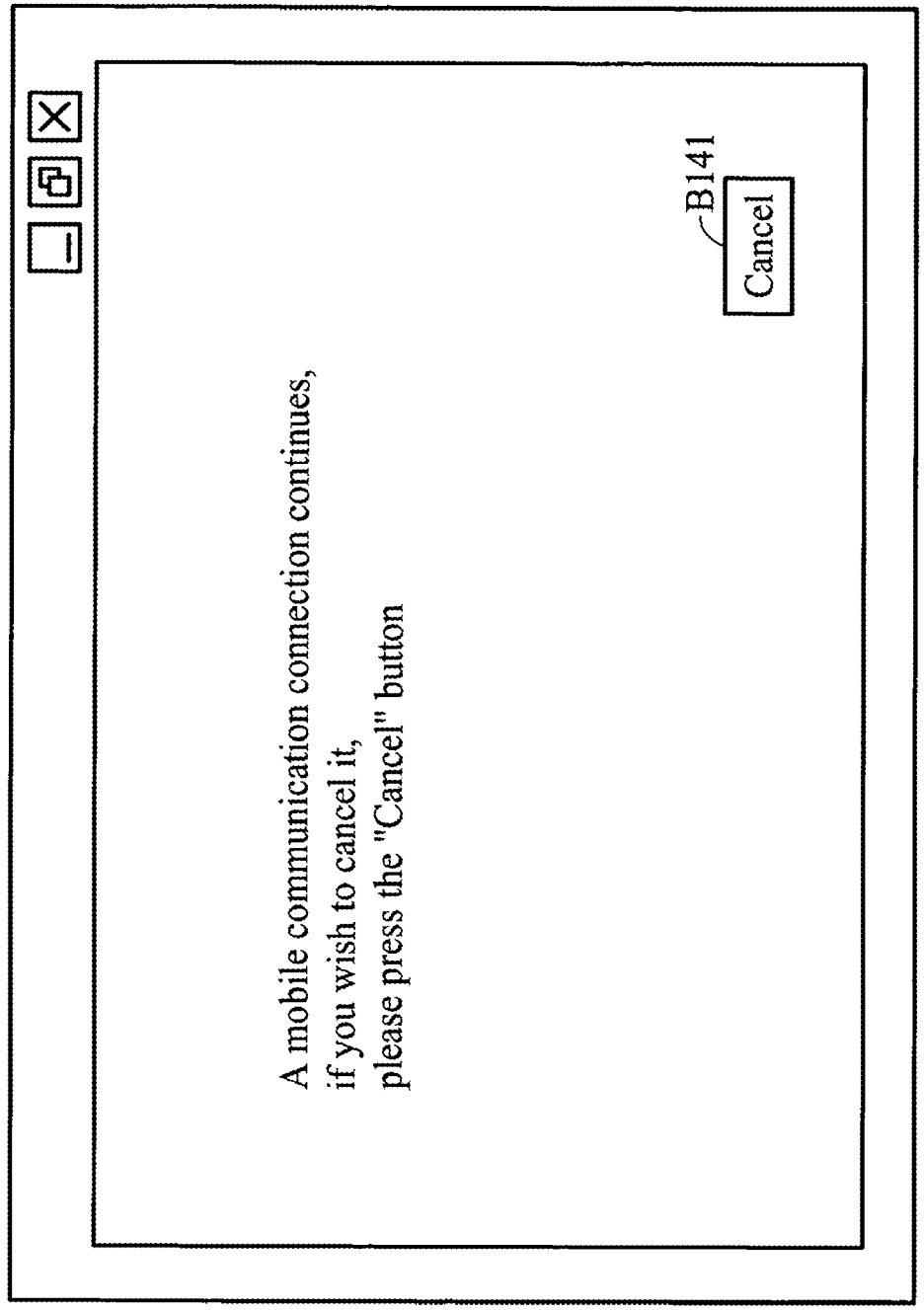
FIG. 14 is a diagram of an embodiment of a UI for prompting a user to cancel the current mobile communication connection.

Referring to FIG. 11b, in step S1211, it is determined after a predetermined period of time, whether a UI button (FIG. 12) has been pressed. If so, the process proceeds to step S1231, otherwise, to step S1271. In step S1231, it is determined whether the pressed button is the "Accept" button B121 (FIG. 12) or the "Reject" button B123 (FIG. 12). If the pressed button is the "Accept" button B121, the process proceeds to step S1251, otherwise, to step S1233. In step S1233, at least one AT command is issued to the mobile electronic device 23 (FIG. 2) for instructing the mobile electronic device 23 to reject/ignore the detected incoming call request. In step S1251, a UI is displayed for prompting a user to select a communication mode. FIG. 13 is a diagram of a UI for prompting a user to select a communication mode, comprising four UI object options O131 to O137 respectively utilized to determine a communication mode by user, and a submit button B131. When one of the UI object options is selected and the submit button B131 is pressed, a particular communication mode is determined. Referring to FIG. 11b, in step S1253, AT commands are issued to the mobile electronic device 23 for accepting the incoming call request and configuring the mobile electronic device 23 contingent upon the selected communication mode. The details of the mobile electronic device configuration are described in the following. In step S1255, a UI is displayed for prompting a user to cancel the mobile phone connection. FIG. 14 is a diagram of a UI for prompting a user to cancel the current mobile communication connection, comprising a "cancel" button B141. When the cancel button B141 is pressed, the current mobile communication connection will be terminated. Referring to FIG. 11b, in step S1271, at least one AT command is issued for querying whether the detected incoming call request is terminated. In step S1273, it is determined whether the detected incoming call request is terminated. If so, the process returns to step S1111 (FIG. 11a), otherwise, to step S1291. It is determined that the detected incoming call request is terminated when a reply message indicating that the detected incoming call request has been terminated is received. Otherwise, it is determined that the detected incoming call request is still present when a reply message indicating that the detected incoming call request is not terminated is received or when no reply message has been received before a time-out expires. In step S1291, at least one AT command is issued to the mobile electronic device 23 for querying whether a new SM or MM has been received. In step S1293, it is determined whether a new SM or MM is received. If so, the process proceeds to step S1295, and otherwise, returns to step S1211. It is determined that a new SM or MM is received when a SM or MM reply is received. Otherwise, it is determined that no new SM or MM is received when a reply message indicating that no new SM or MM has been received is received or that no reply message has been received before a time-out expires. In step S1295, the replied SM or MM is displayed via a UI.

Figure 11C:
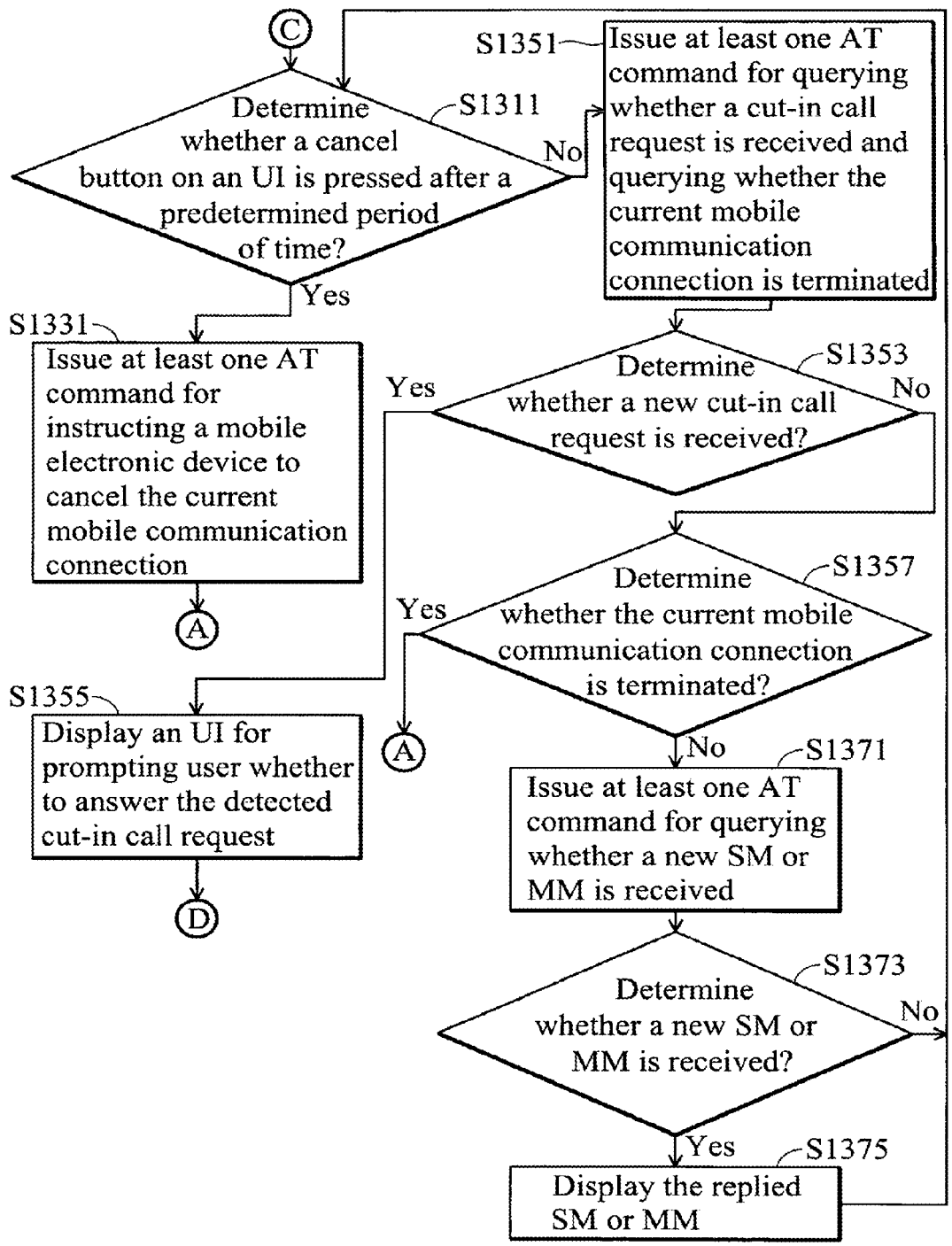
Figure 15:
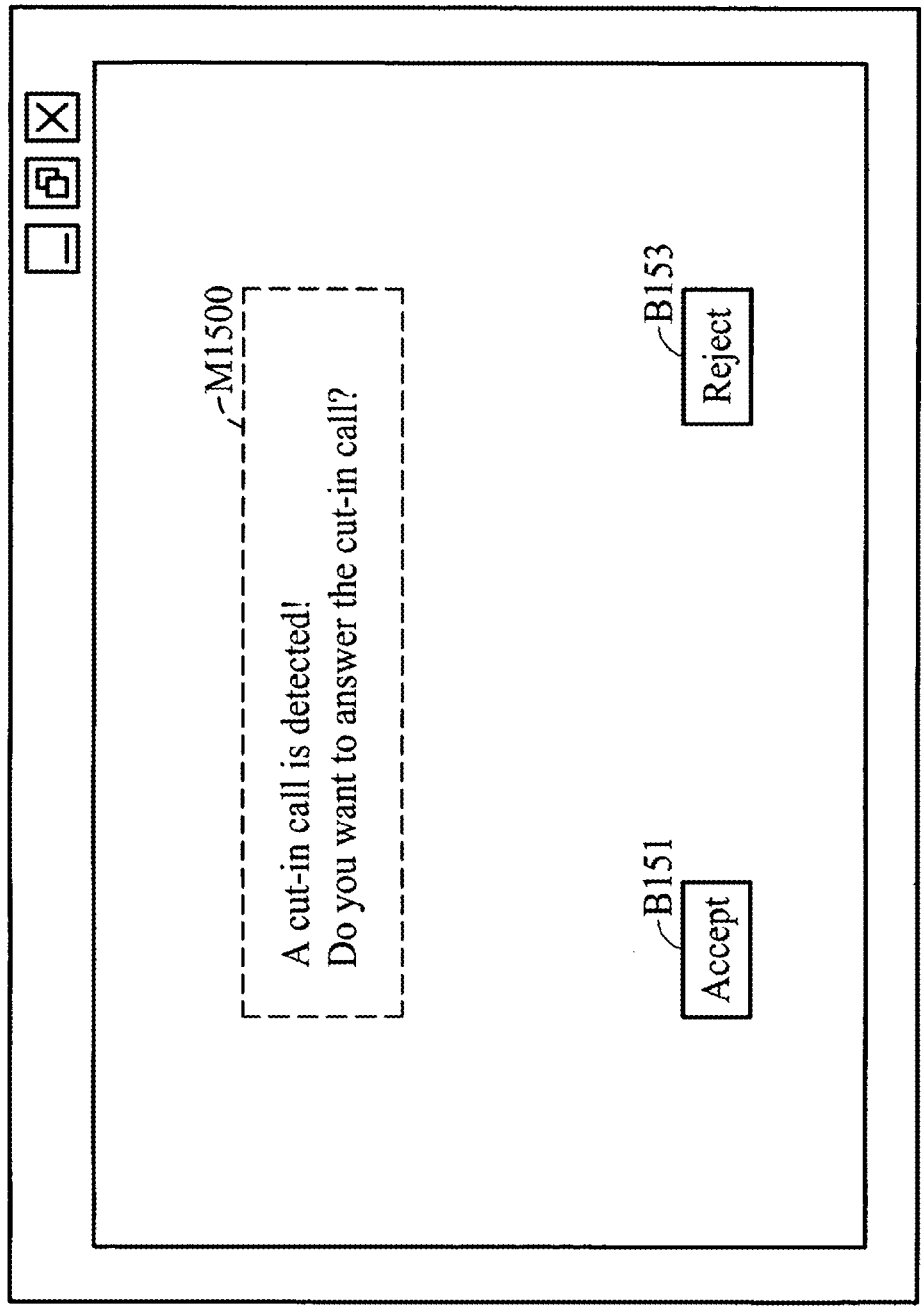
FIG. 15 is a diagram of an embodiment of a UI for prompting a user whether to answer the detected cut-in call request.

Referring to FIG. 11c, in step S1311, it is determined after a predetermined period of time, whether the cancel button B141 on the UI (FIG. 14) is pressed. If so, the process proceeds to step S1331, otherwise, to step S1351. In step S1331, at least one AT command is issued to the mobile electronic device 23 (FIG. 2) for instructing the mobile electronic device 23 to cancel the current mobile communication connection. In step S1351, at least one AT command is issued to the mobile electronic device 23 for querying whether a cut-in call request is received from a remote mobile electronic device via a cellular network and querying whether the current mobile communication connection is terminated. In step S1353, it is determined whether a new cut-in call request is received. If so, the process proceeds to step S1355, otherwise, to step S1357. It is determined that a new cut-in call request is received when a reply message indicating that a new cut-in call request has been received is received. Otherwise, it is determined that no new cut-in call request is received when a reply message indicating that no new cut-in call request has been received is received or when no reply message has been received before a time-out expires. In step S1355, a user interface (UI) for prompting a user whether to answer the detected cut-in call request. FIG. 15 is a diagram of an embodiment of a UI for prompting a user whether to answer the detected cut-in call request, comprising a prompting message M1500 and two buttons B151 and B153. In step S1357, it is determined whether the current mobile communication connection is terminated. Note that the current mobile communication connection may be terminated resulting from hanging up by a remote user. If so, the process returns to step S1111 (FIG. 11a), otherwise, to step S1371. It is determined that the current mobile communication connection is terminated when a reply message indicating that the current mobile communication connection has been terminated is received or when no reply message has been received before a time-out expires. Otherwise, it is determined that the current mobile communication connection is not terminated when a reply message indicating that the current mobile communication connection is not terminated is received. In step S1371, at least one AT command is issued to the mobile electronic device 23 for querying whether a new SM or MM is received. In step S1373, it is determined whether a new SM or MM is received. If so, the process proceeds to step S1375, otherwise, returns to step S1311. It is determined that a new SM or MM is received when a SM or MM reply is received. Otherwise, it is determined that no new SM or MM is received when a reply message indicating that no new SM or MM has been received is received or that no reply message has been received before a time-out expires. In step S1375, the replied SM or MM is displayed via a UI.

Figure 11D:
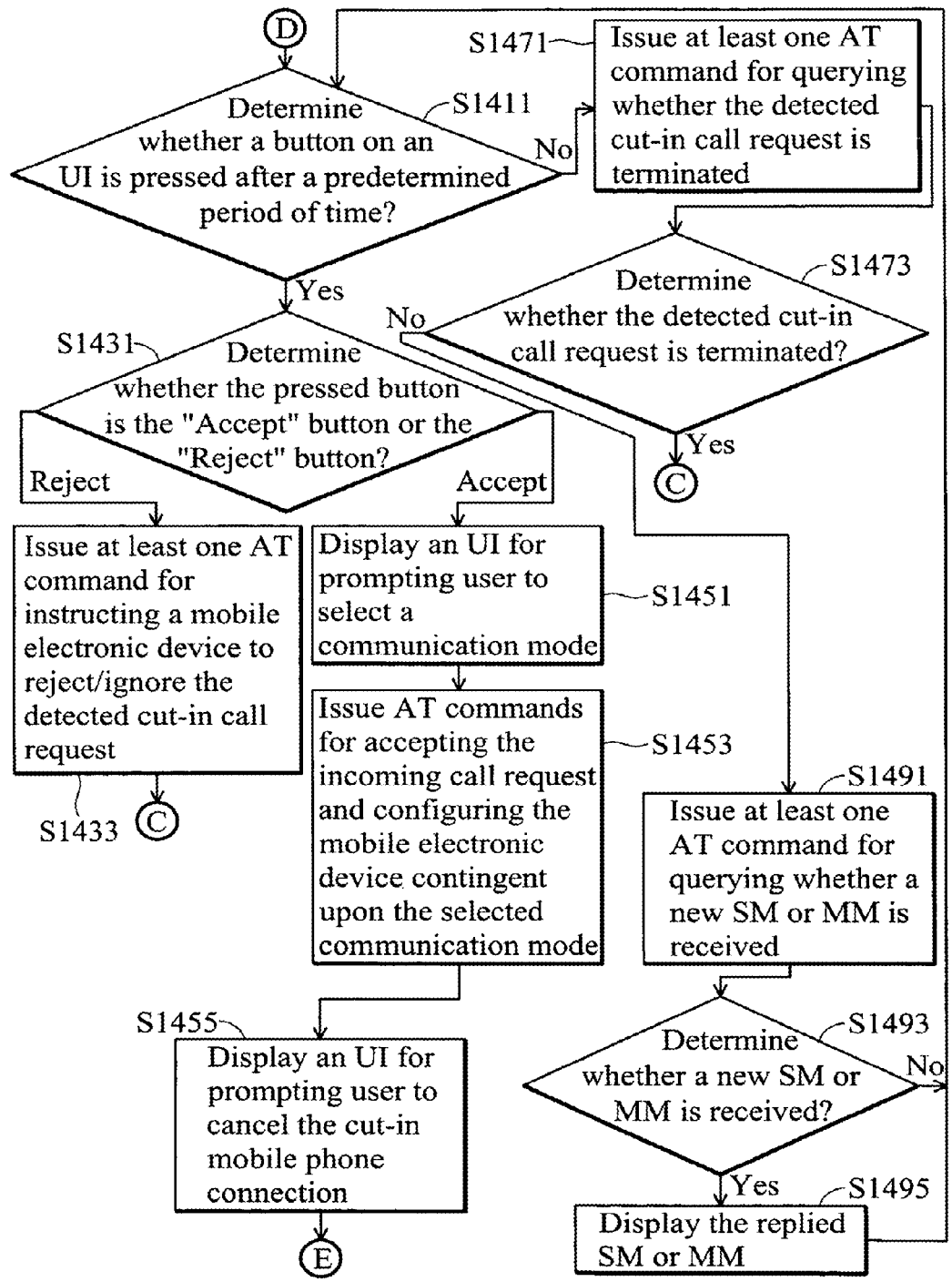
Figure 16:
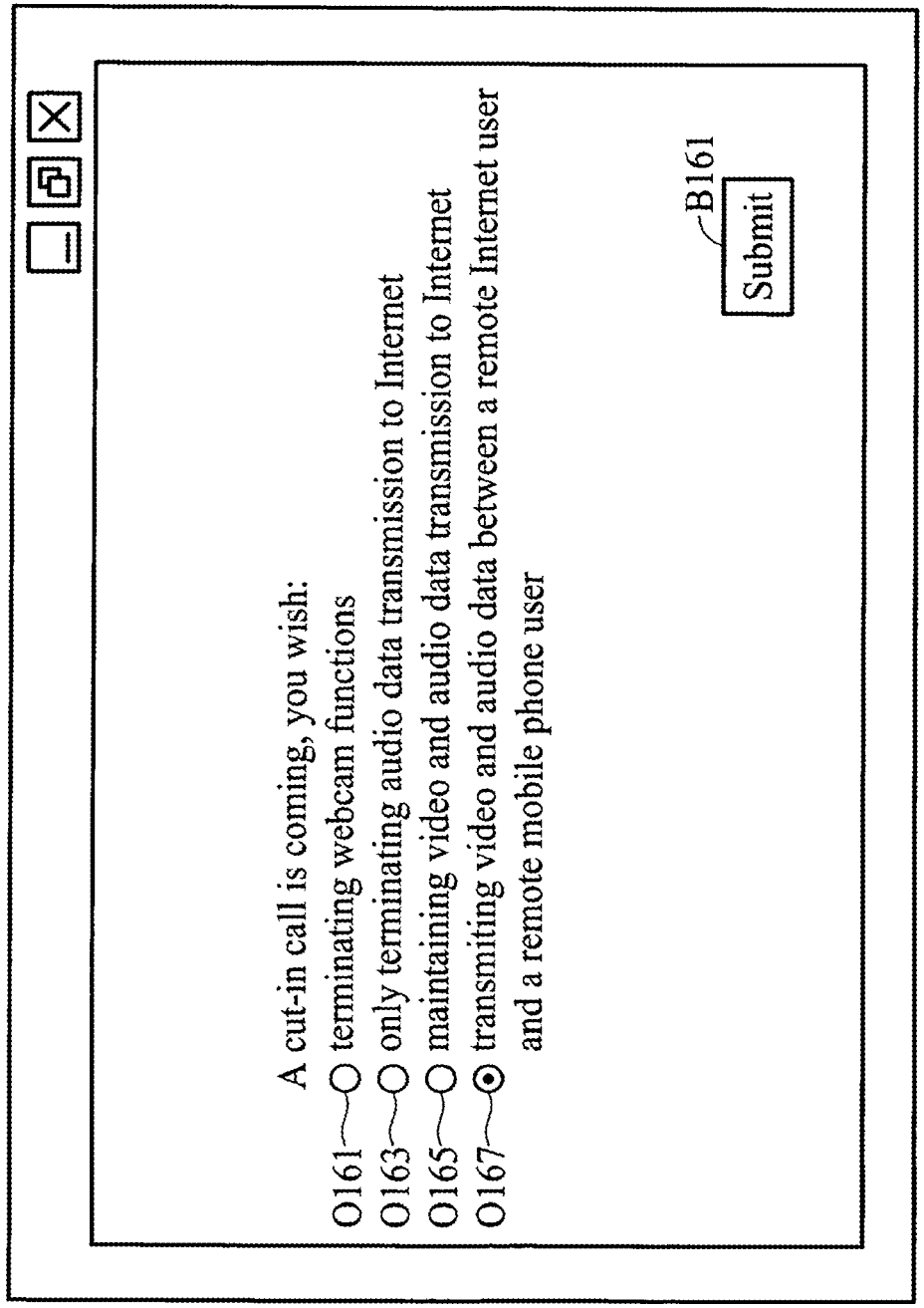
FIG. 16 is a diagram of an embodiment of a UI for prompting a user to select a communication mode.
Figure 17:
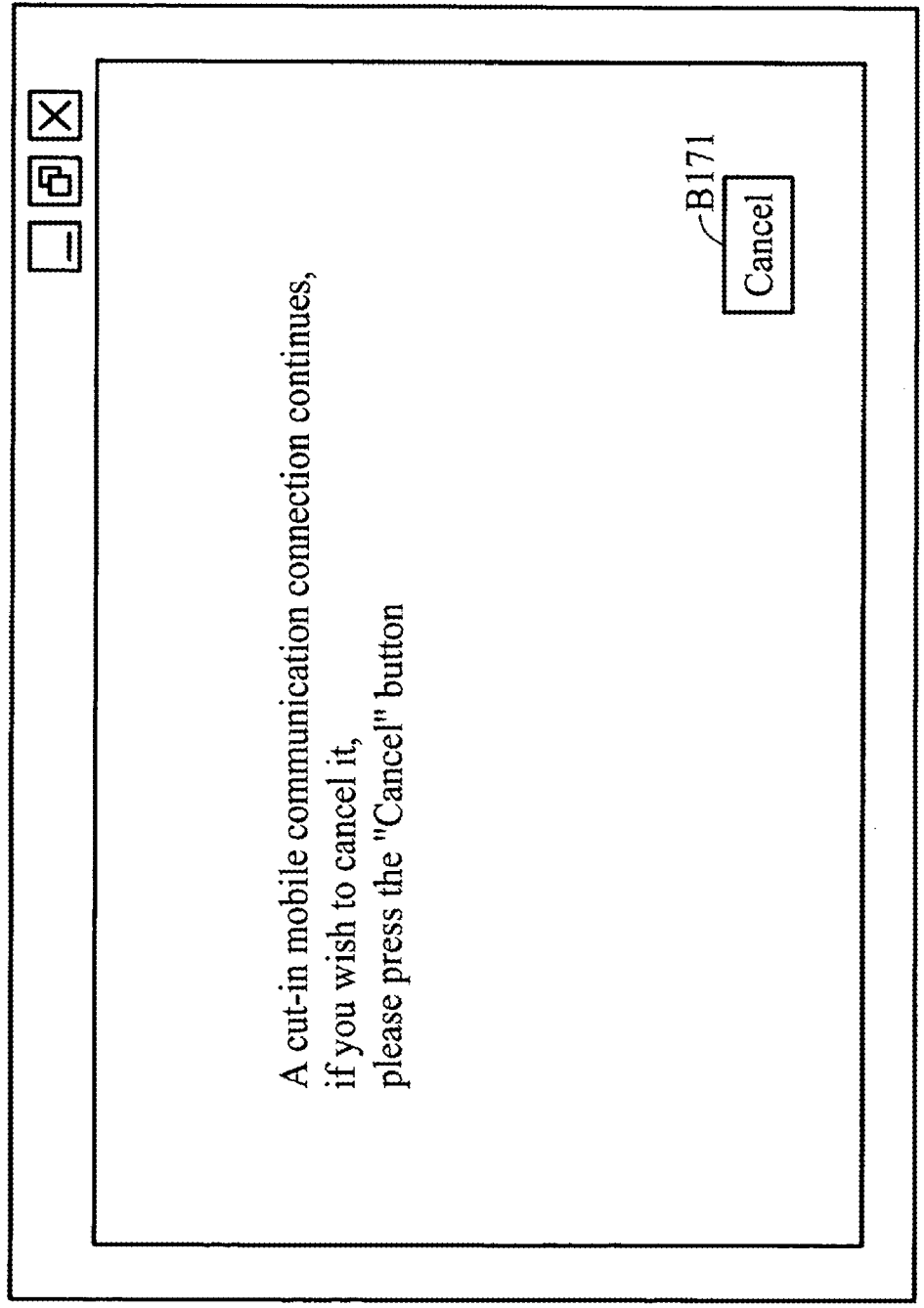
FIG. 17 is a diagram of an embodiment of a UI for prompting a user to cancel the cut-in mobile communication connection.

Referring to FIG. 11d, in step S1411, it is determined after a predetermined period of time, whether a UI button (FIG. 15) is pressed. If so, the process proceeds to step S1431, otherwise, to step S1471. In step S1431, it is determined whether the pressed button is the "Accept" button B151 (FIG. 15) or the "Reject" button B153 (FIG. 15). If the pressed button is the "Accept" button B151 (FIG. 15), the process proceeds to step S1451, otherwise, to step S1433. In step S1433, at least one AT command is issued to the mobile electronic device 23 (FIG. 2) for instructing the mobile electronic device 23 to reject/ignore the detected cut-in call request. In step S1451, a UI is displayed for prompting a user to select a communication mode. FIG. 16 is a diagram of a UI for prompting a user to select a communication mode, comprising four UI object options O161 to O167 respectively utilized to determine a communication mode by user, and a submit button B131. When one of the UI object options is selected and the submit button B131 is pressed, a particular communication mode is determined. Referring to FIG. 11d, in step S1453, AT commands are issued to the mobile electronic device 23 for accepting the cut-in call request, halting the current mobile communication connection and configuring the mobile electronic device 23 contingent upon the selected communication mode. The details of the mobile electronic device configuration are described in the following. In step S1455, a UI is displayed for prompting a user to cancel the cut-in mobile phone connection. FIG. 17 is a diagram of a UI for prompting a user to cancel the cut-in mobile communication connection, comprising a "cancel" button B171. When the cancel button B171 is pressed, the cut-in mobile communication connection will be terminated. Referring to FIG. 11d, in step S1471, at least one AT command is issued for querying whether the detected cut-in call request is terminated. In step S1473, it is determined whether the detected incoming call request is terminated. If so, the process returns to step S1311 (FIG. 11c), otherwise, to step S1491. It is determined that the detected cut-in call request is terminated when a reply message indicating that the detected cut-in call request has been terminated is received. Otherwise, it is determined that the detected cut-in call request is still present when a reply message indicating that the detected cut-in call request is not terminated is received or when no reply message has been received before a time-out expires. In step S1491, at least one AT command is issued to the mobile electronic device 23 for querying whether a new SM or MM is received. In step S1493, it is determined whether a new SM or MM is received. If so, the process proceeds to step S1495, otherwise, returns to step S1411. It is determined that a new SM or MM is received when a SM or MM reply is received. Otherwise, it is determined no new SM or MM is received when a reply message indicating that no new SM or MM has been received is received or that no reply message has been received before a time-out expires. In step S1495, the replied SM or MM is displayed via a UI.

Figure 11E:
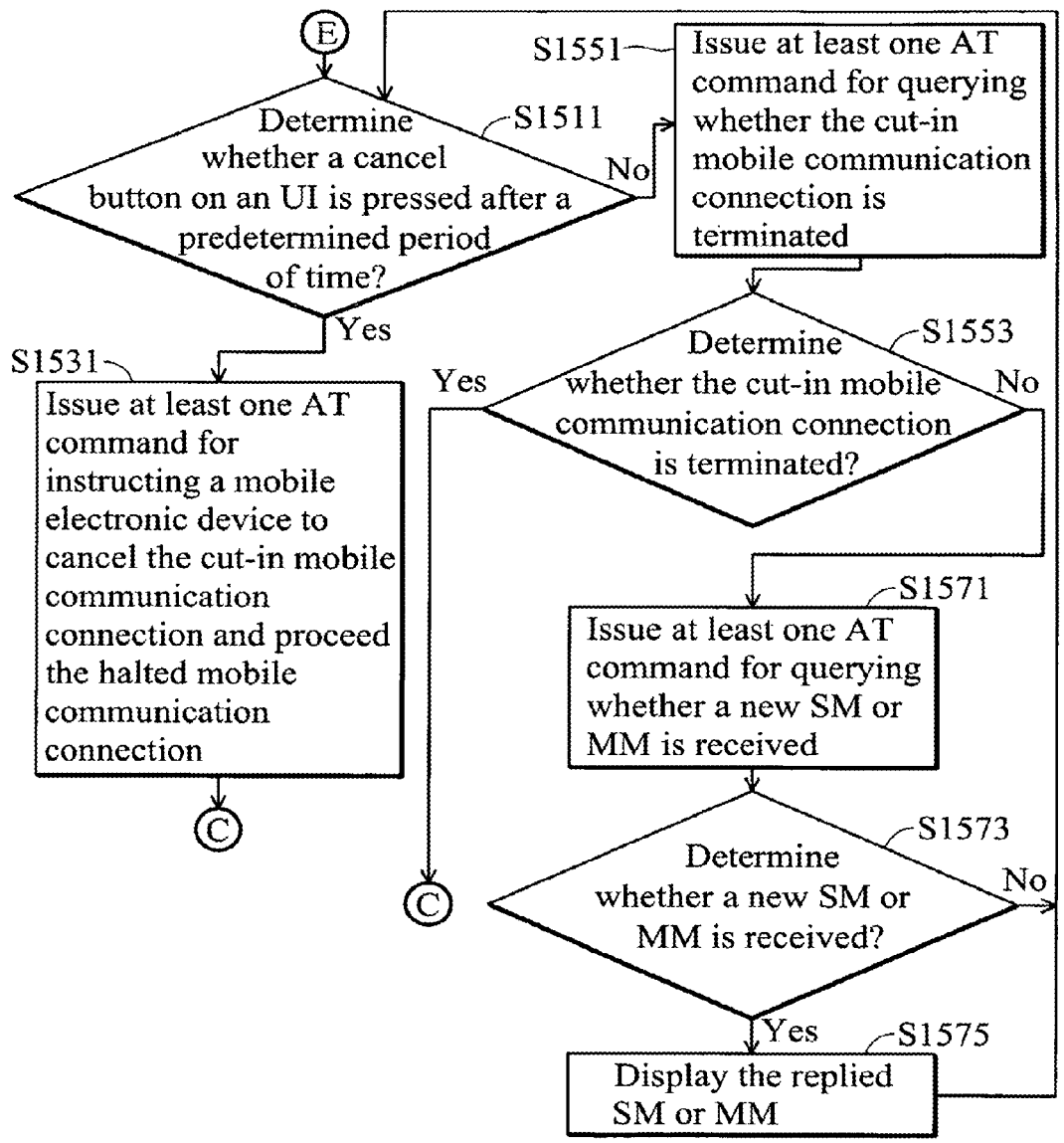

Referring to FIG. 11e, in step S1511, it is determined after a predetermined period of time, whether the cancel button B171 on the UI (FIG. 17) is pressed. If so, the process proceeds to step S1531, otherwise, to step S1551. In step S1531, at least one AT command is issued to the mobile electronic device 23 (FIG. 2) for instructing the mobile electronic device 23 to cancel the cut-in mobile communication connection and proceed the halted mobile communication connection. In step S1551, at least one AT command is issued to the mobile electronic device 23 for querying whether the cut-in mobile communication connection is terminated. In step S1353, it is determined whether the cut-in mobile communication connection is terminated. Note that the cut-in mobile communication connection may be terminated resulting from hanging up by a remote user. If so, the process returns to step S1311 (FIG. 11c), otherwise, to step S1571. It is determined that the cut-in mobile communication connection is terminated when a reply message indicating that the current mobile communication connection has been terminated is received or that no reply message has been received before a time-out expires. Otherwise, it is determined that the cut-in mobile communication connection is not terminated when a reply message indicating that the cut-in mobile communication connection is not terminated is received. In step S1571, at least one AT command is issued to the mobile electronic device 23 for querying whether a new SM or MM is received. In step S1573, it is determined whether a new SM or MM is received. If so, the process proceeds to step S1575, otherwise, returns to step S1511. It is determined that a new SM or MM is received when a SM or MM reply is received. Otherwise, it is determined no new SM or MM is received when a reply message indicating that no new SM or MM has been received is received or when no reply message has been received before a time-out expires. In step S1575, the replied SM or MM is displayed via a UI.

Figure 18:
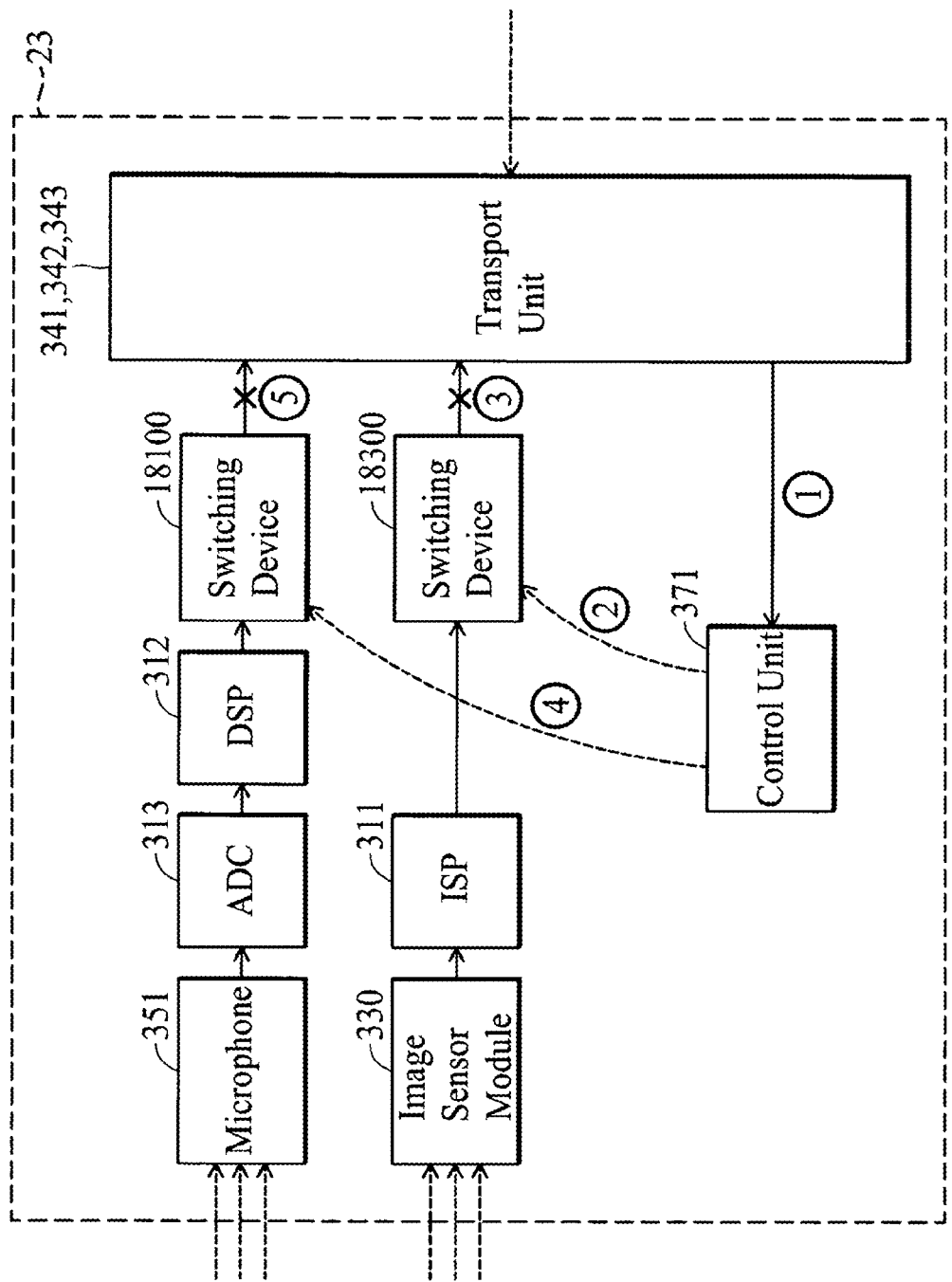
FIG. 18 is a diagram illustrating an exemplary scenario for disabling display and acoustic object transmission from a mobile electronic device to a computer host.

Referring to steps S1251 to S1253 (FIG. 11b) with a UI (FIG. 13), or steps S1451 to S1453 (FIG. 11d) with a UI (FIG. 16), one mode can be selected from four predefined modes to configure webcam and mobile communication functions with the mobile electronic device 23 (FIG. 2). When the option UI object O131 or O161 is selected, the control tool 5700 (FIG. 5) may issue relevant AT commands to the mobile electronic device 23 via the transport device 46 (FIG. 4) to disable display and acoustic object transmission from the mobile electronic device 23 to the computer host 21 (FIG. 2). Alternatively, the control tool 5700 (FIG. 5) may instruct the webcam related application 5300 (FIG. 5) or both the class mini-drivers 5531 and 5533 (FIG. 5) to disable reception of display and acoustic objects from the mobile electronic device 23. As a result, the remote P2P communication application receives no display and acoustic objects from the computer host 21. FIG. 18 is a diagram illustrating an exemplary scenario wherein the display and acoustic object transmission from the mobile electronic device 23 to the computer host 21 is disabled. An AT parser executed by a control unit 371 (FIG. 3) parses the received AT commands from the computer host 21, comprising operations for disabling display and acoustic object transmission from the mobile electronic device 23 to the computer host 21. A driving control console executed by the control unit 371 accordingly configures relevant drivers (firmware) to turn off a switching device 18100 from transmitting display objects to the computer host 21 and to turn off a switching device 18300 from transmitting acoustic objects to the computer host 21 (i.e. disabling a transmission path). The switching device 18100 may also be disposed in the ADC 313 or the DSP 312, between the microphone 351 and ADC 313, or between the ADC 313 and DSP 312. Note that the switching device 18300 may be disposed in the ISP 311 or between the image sensor module 330 and ISP 311. Moreover, when users intend to re-enable the reception of display and acoustic objects from the mobile electronic device 23, users may operate the control tool 5700 to instruct the webcam related application 5300 or both the class mini-drivers 5531 and 5533 to enable reception of display and acoustic objects from the mobile electronic device 23. An AT parser executed by the control unit 371 parses the received AT commands from the computer host 21, comprising operations for enabling display and acoustic object transmission from the mobile electronic device 23 to the computer host 21. Subsequently, a driving control console executed by the control unit 371 accordingly configures relevant drivers (firmware) to turn on the switching device 18100 and to turn on the switching device 18300 (i.e. re-enabling a transmission path).

Figure 19:
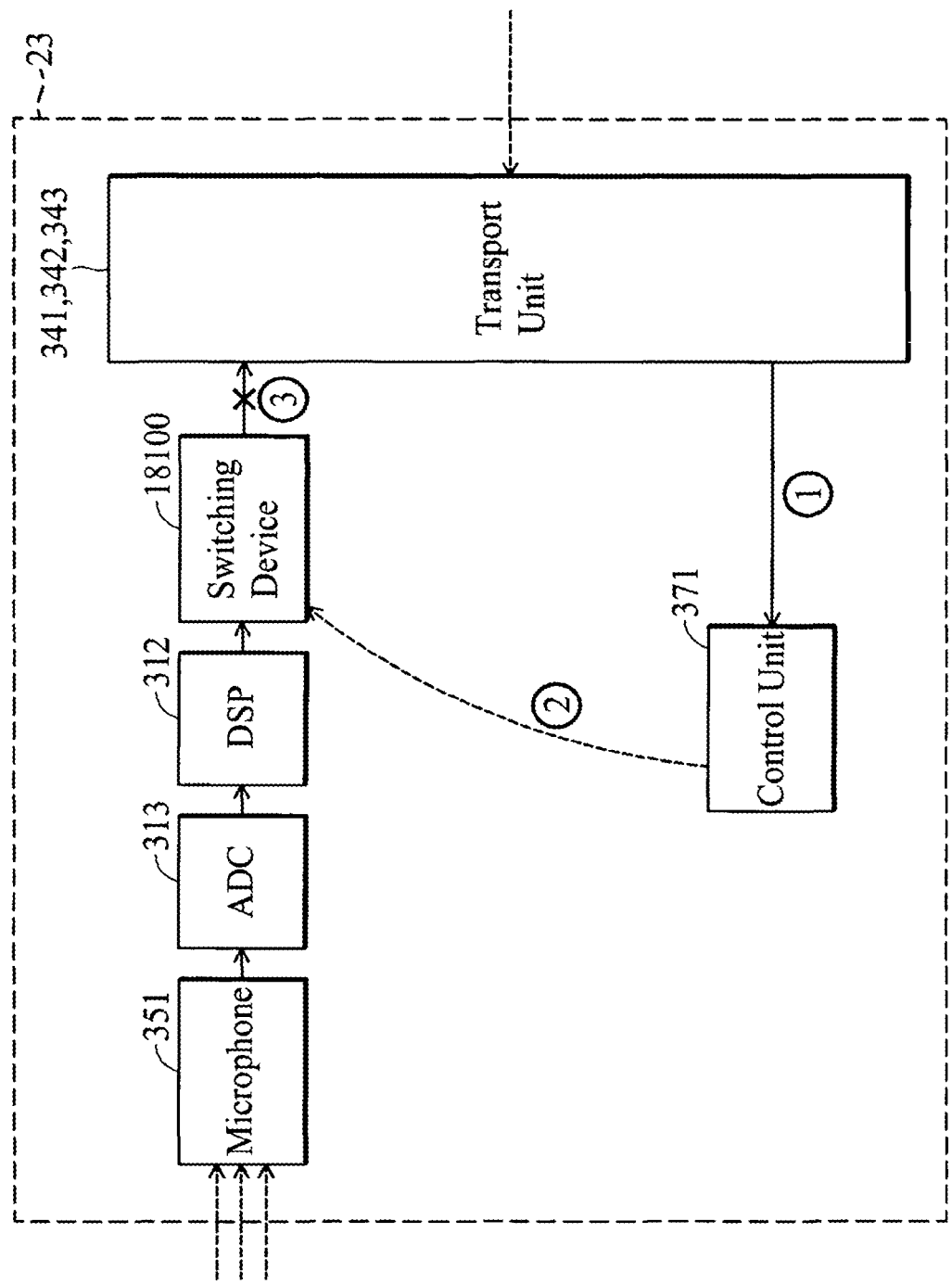
FIG. 19 is a diagram illustrating an exemplary scenario for disabling acoustic object transmission from a mobile electronic device to a computer host.

Referring to steps S1251 to S1253 (FIG. 11b) with a UI (FIG. 13), or steps S1451 to S1453 (FIG. 11d) with a UI (FIG. 16), when the option UI object O133 or O163 is selected, the control tool 5700 (FIG. 5) may issue relevant AT commands to the mobile electronic device 23 to disable acoustic object transmission from the mobile electronic device 23 to the computer host 21 (FIG. 2). Alternatively, the control tool 5700 (FIG. 5) may instruct the webcam related application 5300 (FIG. 5) or the class mini-driver 5531 (FIG. 5) to disable receiving of acoustic objects from the mobile electronic device 23. As a result, the remote P2P communication application receives no acoustic object from the computer host 21. FIG. 19 is a diagram illustrating an exemplary scenario wherein the acoustic object transmission from the mobile electronic device 23 to the computer host 21 is disabled. An AT parser executed by the control unit 371 (FIG. 3) parses the received AT commands from the computer host 21, comprising operations for disabling acoustic object transmission from the mobile electronic device 23 to the computer host 21. A driving control console executed by the control unit 371 accordingly configures relevant driver (firmware) to turn off the switching device 18100 from transmitting display objects to the computer host 21 (i.e. disabling a transmission path). The switching device 18100 may be also disposed in the ADC 313 or the DSP 312, between the microphone 351 and ADC 313, or between the ADC 313 and DSP 312. As a result, the display objects are continually transmitted from the mobile electronic device 23 to the computer host 21, but the acoustic objects corresponding to analog sound signals received from the microphone 351 (FIG. 3) are not transmitted from the mobile electronic device 23 to the computer host 21. Instead, the acoustic objects corresponding to analog sound signals received from the microphone 351 (FIG. 3) are transmitted to the transceiver 320 to be transmitted to the remote mobile electronic device 91 (FIG. 9) via a cellular network for phone conversation.

Referring to steps S1251 to S1253 (FIG. 11*b*) with a UI (FIG. 13), or steps S1451 to S1453 (FIG. 11*d*) with a UI (FIG. 16), when the option UI object O135 or O165 is selected, the control tool 5700 (FIG. 5) does nothing and the display and acoustic object transmission from the mobile electronic device 23 (FIG. 2) to the computer host 21 (FIG. 2) is retained as shown in FIGS. 7*a*, 7*b*, 8*a* and 8*b*. As a result, the remote P2P communication application receives display and acoustic objects from the computer host 21. As a result, the acoustic objects corresponding to analog sound signals received from the microphone 351 (FIG. 3) are not only transmitted from the mobile electronic device 23 to the computer host 21 to be transmitted to the remote electronic apparatus/device 61 (FIG. 9) via the internet, but also are transmitted to the transceiver 320 to be transmitted to the remote mobile electronic device 91 (FIG. 9) via the cellular network. Alternatively, the analog sound signals can also received from a microphone (not shown) equipped by the computer host 21, instead of the microphone 351, and the corresponding acoustic objects are transmitted to the remote electronic apparatus/device 61 via the IP network.

Referring to steps S1251 to S1253 (FIG. 11*b*) with a UI (FIG. 13), or steps S1451 to S1453 (FIG. 11*d*) with a UI (FIG. 16), when the option UI object O137 or O167 is selected, the control tool 5700 (FIG. 5) may issue relevant AT commands to the mobile electronic device 23 via the transport device (FIG. 4) to retain the display and acoustic object transmission between the mobile electronic device 23 (FIG. 2) and the computer host 21 (FIG. 2), and further enable display and acoustic object transmission between the remote electronic apparatus/device 61 (FIG. 9) and the remote mobile electronic device 91 (FIG. 9).

The acoustic and display objects originally acquired by the remote mobile electronic device 91 are transmitted to the mobile electronic device 23 via cellular network, and then transmitted to the computer host 21 via the connection between the computer host 21 and the mobile electronic device 23, and then transmitted from the computer host 21 to the remote electronic apparatus/device 61 via the IP network. The acoustic and display objects originally acquired by the mobile electronic device 23 are transmitted to the computer host 21, and then transmitted to the remote mobile electronic device 91 via the IP network. As a result, the remote P2P communication application resident on the remote electronic apparatus/device 61 (FIG. 9) plays acoustic and display objects originally acquired by the mobile electronic device 23 (FIG. 9), the remote mobile electronic device 91, and the remote electronic apparatus/device 61. Therefore, an man-machine interface (MMI) resident on the remote mobile electronic device 91 plays acoustic and display objects originally acquired by the mobile electronic device 23 (FIG. 9), the remote mobile electronic device 91, and the remote electronic apparatus/device 61.

The acoustic and display objects originally acquired by the remote mobile electronic device 91 are transmitted to the mobile electronic device 23 via cellular network, and then transmitted to the computer host 21 via the connection between the computer host 21 and the mobile electronic device 23, while the acoustic and display objects originally acquired by the remote electronic apparatus/device 61 are transmitted to the computer host 21 via the IP network. As a result, the P2P communication application resident on the computer host 21 plays acoustic and display objects originally acquired by the mobile electronic device 23 (FIG. 9), the remote mobile electronic device 91, and the remote electronic apparatus/device 61. Therefore, an man-machine interface (MMI) resident on the computer host 21 plays acoustic and display objects originally acquired by the mobile electronic device 23 (FIG. 9), the remote mobile electronic device 91, and the remote electronic apparatus/device 61.

Figure 20:
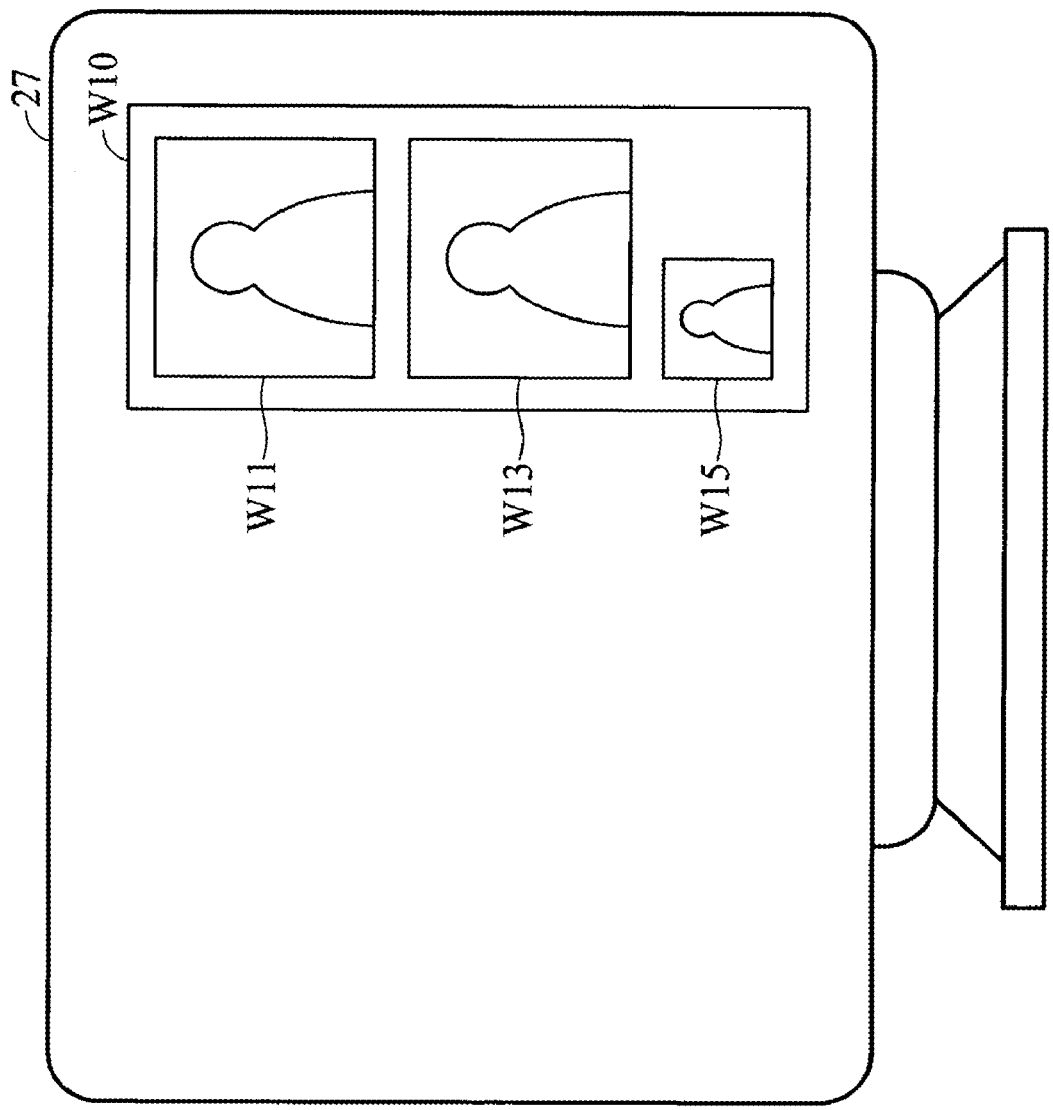
FIG. 20 is a diagram illustrating an exemplary scenario for enabling display and acoustic object transmission between a remote electronic apparatus/device and a remote mobile electronic device.

FIG. 20 is a diagram of an exemplary window W10 displayed on display 27 (FIGS. 6 & 9). The window W10 containing three sub windows W11, W13 and W15 simultaneously shows display objects originally acquired from the mobile electronic device 23, the remote mobile electronic device 91 and electronic apparatus/device 61. That interfaces showing the display objects originally acquired from these three devices on displays of the remote mobile electronic device 91 and electronic apparatus/device 61 may be deduced by the analogy.

Figure 21:
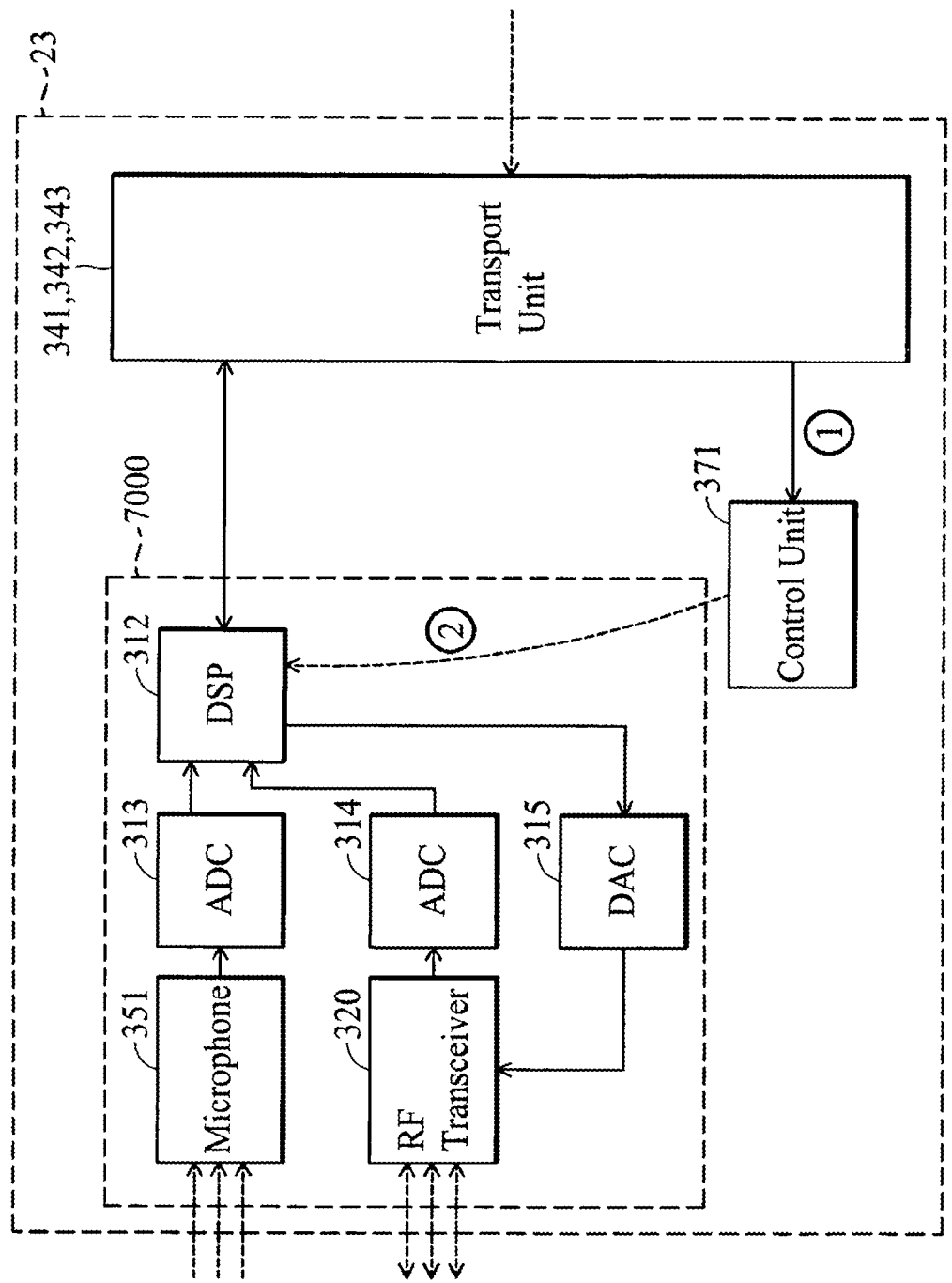
FIG. 21 is a diagram illustrating an exemplary scenario for enabling display and acoustic object transmission between a remote electronic apparatus/device and a remote mobile electronic device.

FIG. 21 is a diagram illustrating an exemplary scenario for enabling display and acoustic object transmission between the remote electronic apparatus/device 61 and the remote mobile electronic device 91. An embodiment of an acoustic object generation unit 7000 comprises the microphone 351, ADC 313, DSP 312, RF transceiver 320, ADC 314 and DAC 315. An AT parser executed by the control unit 371 (FIG. 3) parses the received AT commands from the computer host 21 (FIG. 9), comprising operations for configuring the DSP 312 to mix acoustic objects originally acquired from the microphone 351 and the RF transceiver 320, and then generate mixed acoustic objects to be transmitted to the computer host and then transmitted to the remote electronic apparatus/device 61 via the IP network. The AT parser, as well as, parses the received AT commands from the computer host 21, comprising operations for configuring the DSP 312 to mix acoustic objects originally acquired by the microphone 351 and the remote electronic apparatus/device 61, and then generate the mixed acoustic objects to be transmitted to the remote mobile electronic device 91.

In some embodiments, when the mobile electronic device 23 is connected to the computer host 21, an interface representing the mobile electronic device 23 may be shown on the display 27 facilitating users to control the mobile electronic device 23. FIG. 22 is a diagram of an exemplary interface W220. The interface W220 simulating appearance of the mobile electronic device 23 comprises two areas: a screen area A221 and a keypad area A223. The screen area A221 prompts messages and display UI controls to simulate the display content shown on a display of the mobile electronic device 23. Note that messages and UI controls shown in FIGS. 12 to 17 can be shown in the screen area A221 or other area outside the interface W220. When a click UI event or a double click UI event corresponding to a key displayed in the keypad area A223 is activated, the control tool 5700 issues the relevant AT commands to the mobile electronic device 23, enabling the mobile electronic device 23 to perform a particular operation such as making a phone call, answering an incoming call, rejecting an incoming call request, receiving a short message or an multimedia message, hanging up a call connection or similar. For example, when the mobile electronic device 23 receives an incoming call, a message indicating that reception of incoming call, which may be the interface shown in FIG. 12, will be prompted on the screen area A221. Then, the user can click the "CALL" key displayed on the keypad area A223 for answering the call or the soft key of "Accept" B121. It also can be understood that the message indicating that reception of incoming call can be prompted on the screen area A221 and the display of the mobile electronic device 23 at the same time.

Also, it should be noted that the mobile electronic device 23 may be simultaneously controlled via the interface, including the soft keys on the display and hard keys on the keypad, of the mobile electronic device 23 and via the interface W220 displayed on the computer host 21. That is, the mobile electronic device 23 may be simultaneously controlled by the control tool 5700 of the computer host 21 and by operating system (OS) resident thereon. Those skills in the art will realize that it also can be designed when the mobile electronic device 23 is connected to the computer host 21, the control of mobile electronic device 23 is automatically switched to the control tool 5700 of the computer host 21. In this case, the mobile electronic device 23 can only be controlled via the interface W220 displayed on the computer host 21.

When the mobile electronic device 23 is disconnected from the computer host 21, the control of mobile electronic device 23 is automatically switched to the OS resident on the mobile electronic device 23. Namely, the mobile electronic device 23 can only be controlled via the interface, including the soft keys on the display and hard keys on the keypad, of the mobile electronic device 23.

Certain terms are used throughout the description and claims to refer to particular system components. As one skilled in the art will appreciate, consumer electronic equipment manufacturers may refer to a component by different names. This document does not intend to distinguish between components that differ in name but not function.

Although the invention has been described in terms of preferred embodiment, it is not limited thereto. Those skilled in this technology can make various alterations and modifications without departing from the scope and spirit of the invention. The invention is not limited to merely test or simulation applications. Any applications relating to cross-platform message exchanging should be covered by the scope of the invention. Therefore, the scope of the invention shall be defined and protected by the following claims and their equivalents.

What is claimed is:

1. A method for audio and video communication for use in an electronic device comprising a digital signal processor (DSP) coupled to a microphone, a radio frequency (RF) transceiver and a transport unit, the method comprising:

repeatedly generating a plurality of first acoustic objects corresponding to sound signals detected by the microphone and a plurality of second acoustic objects corresponding to sound signals from a remote mobile electronic device of a cellular network via the RF transceiver, when the electronic device operates as intermediate device between a cellular network and a Internet Protocol (IP) network;

mixing the first and second acoustic objects to generate a first mixed acoustic object, receiving a plurality of third acoustic objects from a remote electronic apparatus of the IP network via the transport device coupling to a computer host of the IP network, and mixing the first and third acoustic objects to generate a second mixed acoustic objects, wherein the generated first mixed acoustic objects are repeatedly transmitted to the remote electronic apparatus of the IP network, and the generated second mixed acoustic objects are repeatedly transmitted to the remote mobile electronic device of the cellular network, so that a three-party call among the electronic device, the remote electronic apparatus of the IP network and the remote mobile electronic device of the cellular network is established.

2. The method as claimed in claim 1, further comprising:
using a display object generation unit, coupled to an image sensor module and the RF transceiver, and when the electronic device operates as intermediate device between the cellular network and the IP network, to repeatedly generate a plurality of display objects corresponding to intensity of light sensed by the image sensor module, and transmitting the generated display objects to the remote mobile electronic device of the cellular network via the RF transceiver.

3. The method as claimed in claim 2, wherein the display object generation unit further transmits the generated display objects to the remote electronic apparatus of the IP network via the transport device.

4. The method as claimed in claim 3, wherein the display object generation unit selects one of plurality of image/video encoders to generate the display objects contingent upon transmission ability of the transport unit.

5. The method as claimed in claim 3, wherein the display object generation unit blends content into a plurality of raw images captured by image sensors or adjusts an image parameter of the raw images to generate the display objects.

6. The method as claimed in claim 1, wherein the DSP activates the generation of the first and second mixed acoustic objects after the electronic device answers an incoming call request from the remote mobile electronic device.

7. The method as claimed in claim 1, wherein the DSP generates the first acoustic objects in a bit rate contingent upon transmission ability of the transport unit.

8. A method for audio and video communication performed by an electronic device, comprising:

repeatedly generating a plurality of first acoustic objects corresponding to sound signals detected by a microphone, and also generating a plurality of second acoustic objects corresponding to sound signals from a remote mobile electronic device of a cellular network, when the electronic device operates as intermediate device between the cellular network and an Internet Protocol (IP) network;

mixing the first and second acoustic objects to generate first mixed acoustic objects;

transporting the generated first mixed acoustic objects to a remote electronic apparatus of the IP network by a computer host coupling the electronic device;

repeatedly generating a plurality of third acoustic objects corresponding to sound signals received from a remote electronic device of the IP network, when the electronic device operates as intermediate device between the cellular network and the IP network;

mixing the first acoustic objects with the third acoustic objects to generate a second mixed acoustic objects; and transporting the generated second mixed acoustic objects to a remote mobile electronic device of the cellular network, so that a three-party call among the electronic device, the remote electronic apparatus of the IP network and the remote mobile electronic device of the cellular network is established.

9. The method as claimed in claim 8, further comprising:

answering an incoming call request from the remote mobile electronic device, wherein the steps for generating the first, second and third acoustic objects are performed after the incoming call request is answered.

10. The method as claimed in claim 8, further comprising:

repeatedly generating a plurality of display objects corresponding to an intensity of light sensed by an image sensor module when the electronic device operates as intermediate device between the cellular network and the IP network; and transmitting the generated display objects to the remote mobile electronic device of the cellular network.

11. The method as claimed in claim 10, further comprising transmitting the generated display objects to the remote electronic apparatus of the IP network.

12. The method as claimed in claim 11, wherein the generated display objects is transmitted to the remote electronic apparatus of the IP network via a computer host, the method further comprising selecting one of plurality of image/video encoders to generate the display objects contingent upon transmission ability between the electronic device and the computer host.

13. The method as claimed in claim 11, further comprising blending content into a plurality of raw images captured by image sensors or adjusting an image parameter of the raw images to generate the display objects.

14. The method as claimed in claim 8, wherein the first mixed acoustic objects is transmitted to the remote electronic apparatus of the IP network via a computer host, the method further comprising generating the first acoustic objects in a bit rate contingent upon transmission ability between the electronic device and the computer host.

15. A non-transitory storage medium storing a set of program instructions executable by a processing unit of an electronic device, wherein when executing the program instructions, the electronic device performs a method for audio and video communication, comprising;

repeatedly generating a plurality of first acoustic objects corresponding to sound signals detected by a microphone, and also generating a plurality of second acoustic objects corresponding to sound signals from a remote mobile electronic device of a cellular network, when the electronic device operates as intermediate device between the cellular network and an Internet Protocol (IP) network;

mixing the first and second acoustic objects to generate a first mixed acoustic objects;

transporting the generated first mixed acoustic objects to a remote electronic apparatus of the IP network by a computer host coupling the electronic device;

repeatedly generating a plurality of third acoustic objects corresponding to sound signals received from a remote electronic device of the IP network when the electronic device operates as intermediate device between the cellular network and the IP network;

mixing the first acoustic objects with the third acoustic objects to generate a second mixed acoustic objects; and transporting the generated second mixed acoustic objects to a remote mobile electronic device of the cellular network, so that a three-party call among the electronic device, the remote electronic apparatus of the IP network and the remote mobile electronic device of the cellular network is established.

16. The storage medium as claimed in claim 15, wherein the method further comprises:

answering an incoming call request from the remote mobile electronic device, wherein the steps for generating the first, second and third acoustic objects are performed after the incoming call request is answered.

17. The storage medium as claimed in claim 15, further comprising:

repeatedly generating a plurality of display objects corresponding to intensity of light sensed by an image sensor module when the electronic device operates as intermediate device between the cellular network and the IP network; and transmitting the generated display objects to the remote mobile electronic device of the cellular network.

18. The storage medium as claimed in claim 17, further comprising transmitting the generated display objects to the remote electronic apparatus of the IP network.

* * * * *